United States Patent [19]
Fujii

[11] Patent Number: 5,929,841
[45] Date of Patent: Jul. 27, 1999

[54] DATA INPUT UNIT

[75] Inventor: Kenshin Fujii, Ikoma, Japan

[73] Assignee: Sharp Kabushiki Kaisha, Osaka, Japan

[21] Appl. No.: 08/792,457

[22] Filed: Jan. 31, 1997

[30] Foreign Application Priority Data

Feb. 5, 1996 [JP] Japan ................................ 8-019095
  Jul. 23, 1996 [JP] Japan ................................ 8-193136

[51] Int. Cl.⁶ .................................................. G09G 5/08
[52] U.S. Cl. ........................ 345/145; 345/473; 345/127
[58] Field of Search .................................. 345/179, 158,
   345/127, 334, 145, 382, 188, 473; 178/19.01–19.07

[56] References Cited

U.S. PATENT DOCUMENTS 3,611,297  10/1971  Kramer ............................... 340/825.76
  5,223,828  6/1993   McKiel, Jr. ........................ 340/825.19
  5,495,576  2/1996   Ritchey .................................. 345/425
  5,576,732  11/1996  Minakuchi et al. .................... 345/127
  5,635,951  6/1997   Takahashi ............................. 345/127

FOREIGN PATENT DOCUMENTS 3-210622  9/1991  Japan .
  8-320756  3/1996  Japan .

Primary Examiner—Mark R. Powell
Assistant Examiner—Thu Nguyen
Attorney, Agent, or Firm—Nixon & Vanderhye P.C.

[57] ABSTRACT

Three-dimensional position information inputted by an input unit is detected by a detecting unit and is converted into coordinate information in a specific plane and height information in an axial direction perpendicularly intersecting to the plane by an operating section of a processing unit. In the case of a plurality of input units, the information is discriminated per input unit by a discriminating section of the processing unit. The information is stored in a memory section and is taken out from the memory section suitably and is outputted as display information by an I/O section of the processing unit so that display is changed according to a size of the height information. The outputted information is indicated by, for example, a designating graphic on an output unit. At this time, an operator can recognize a distance between the input unit and the detecting unit and discriminate the information according to shades of a color of the designating graphic.

45 Claims, 21 Drawing Sheets

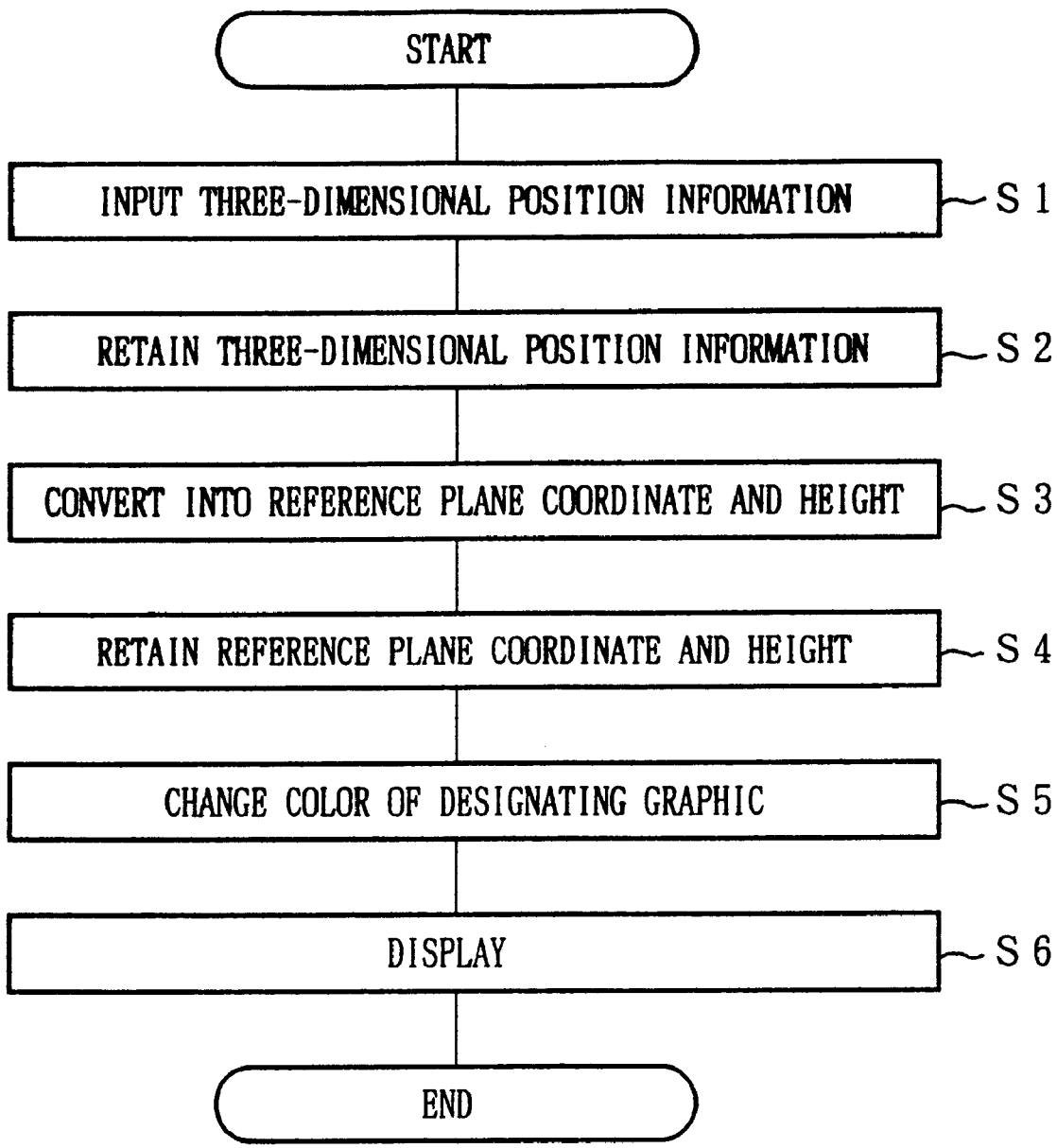

PLANE $\alpha$: $ax+by+cz=0$

FIG. 5(a)
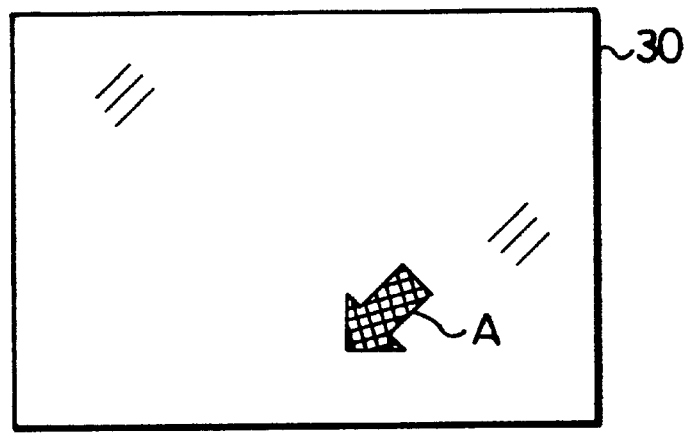
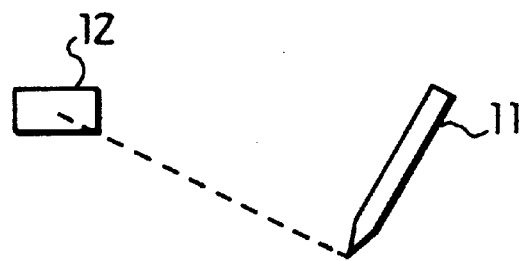
FIG. 5(b)
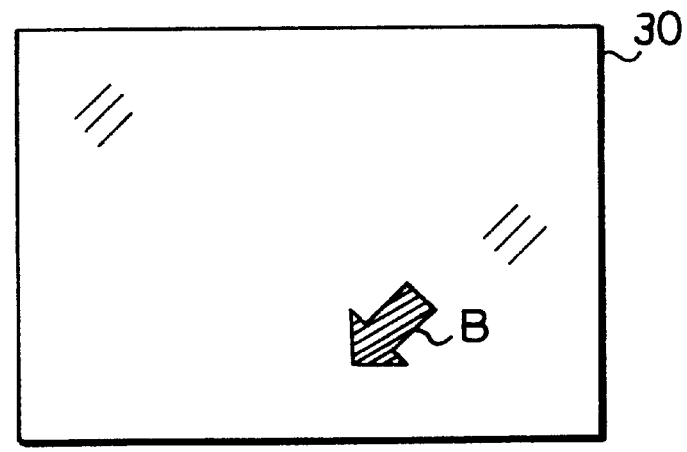
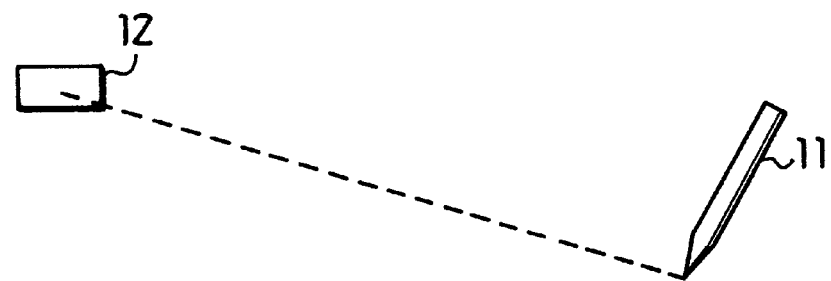

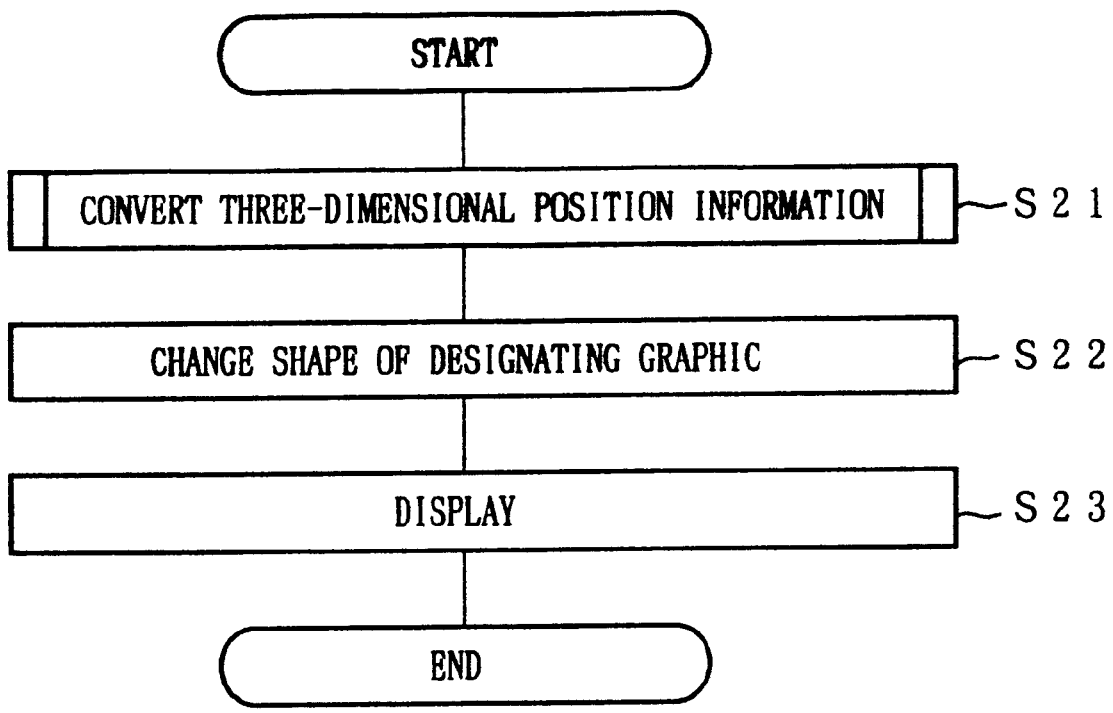

FIG. 7(a)
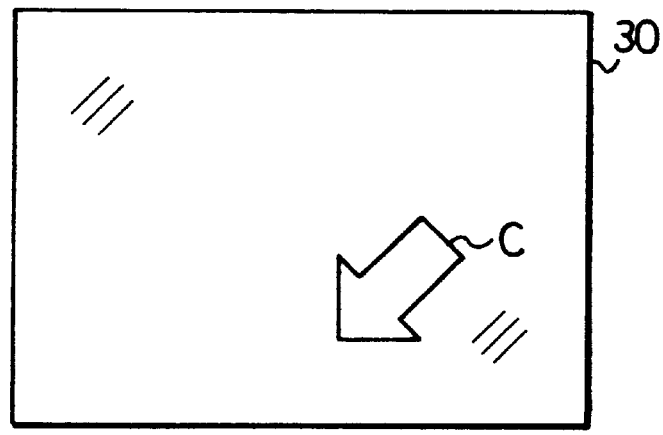
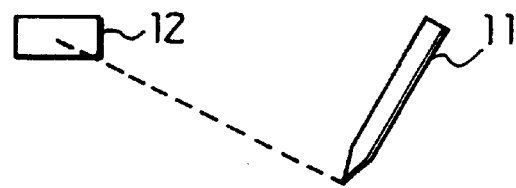
FIG. 7(b)
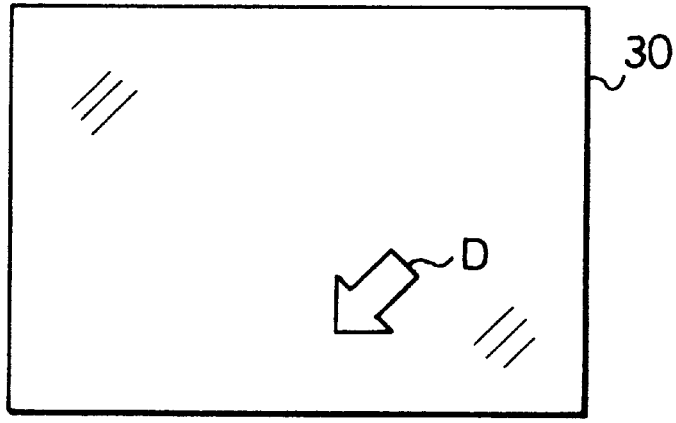
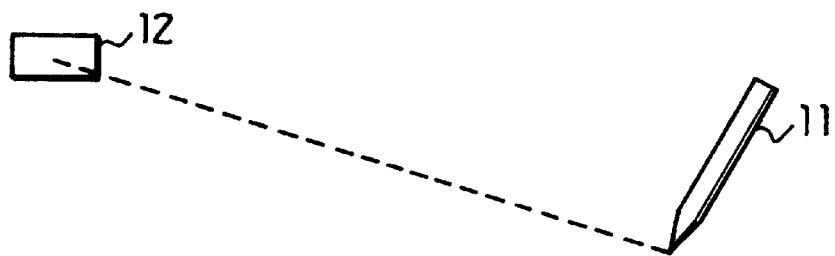

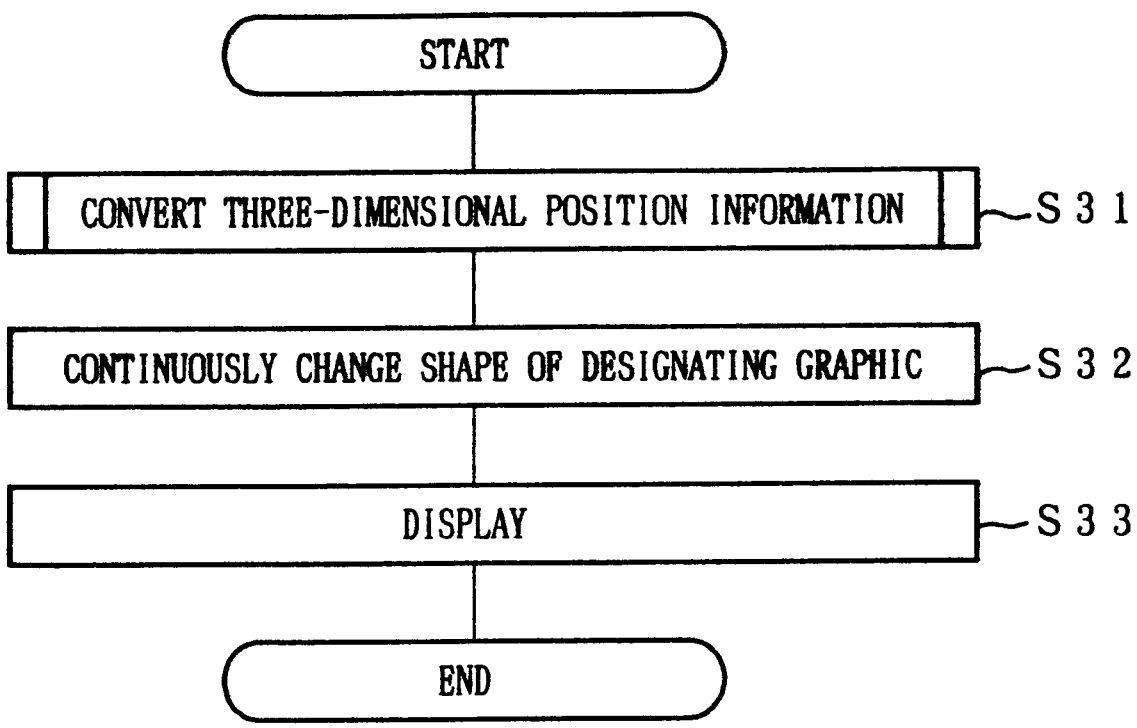

FIG. 9(a)
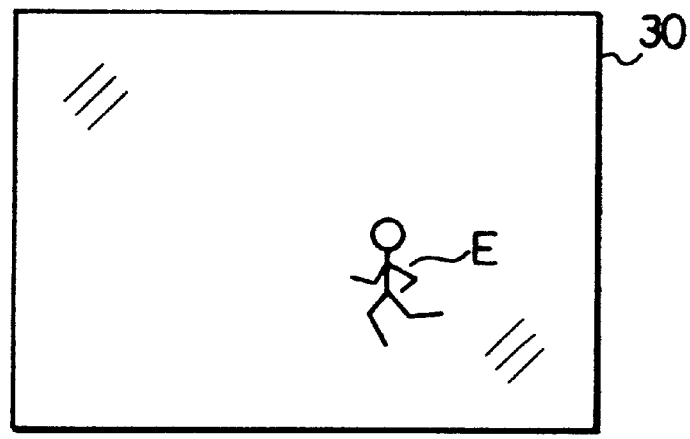
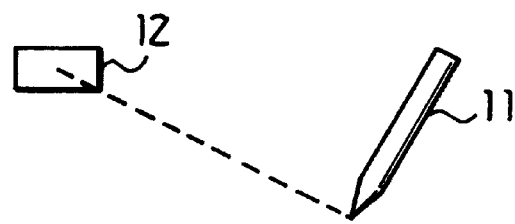
FIG. 9(b)
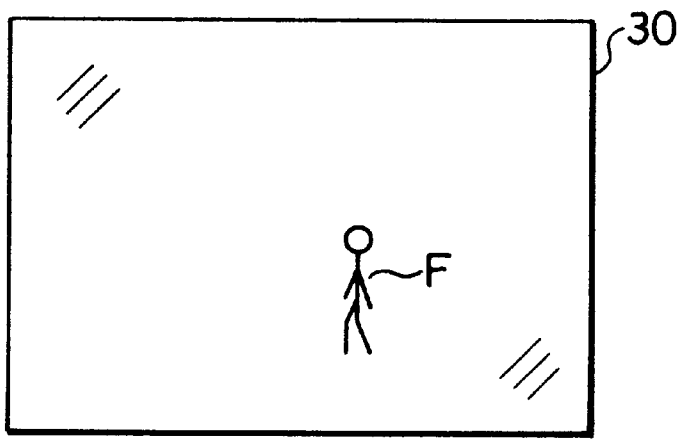
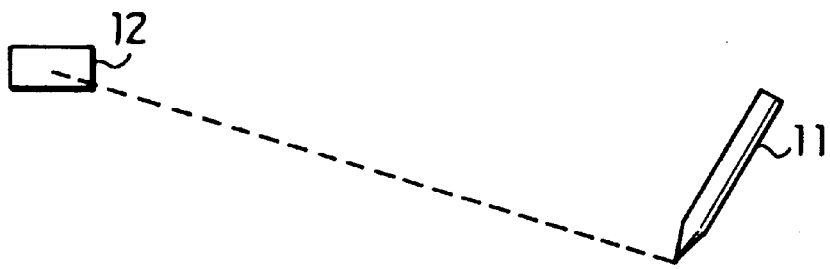

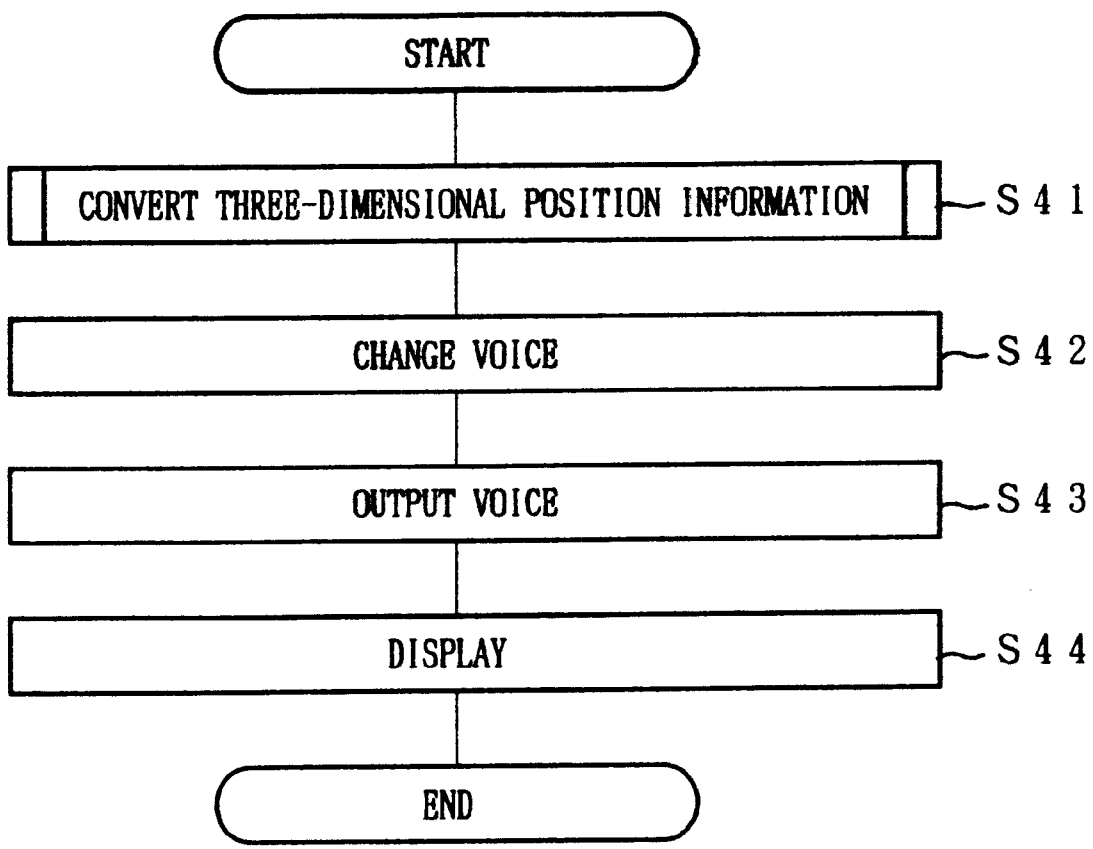

FIG. 11 (a)
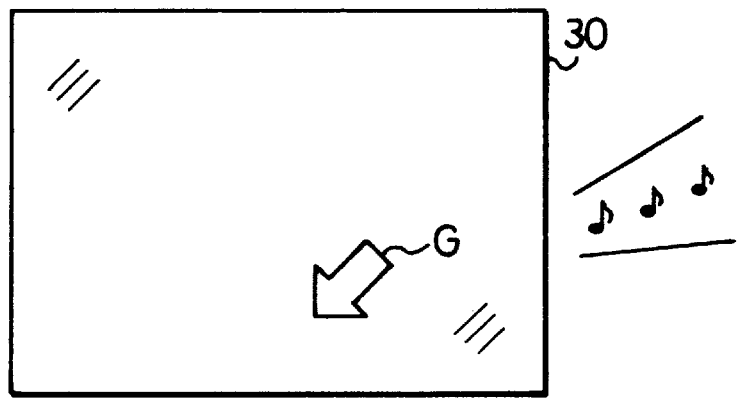
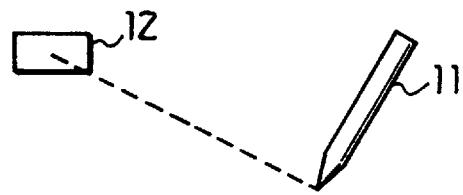
FIG. 11 (b)
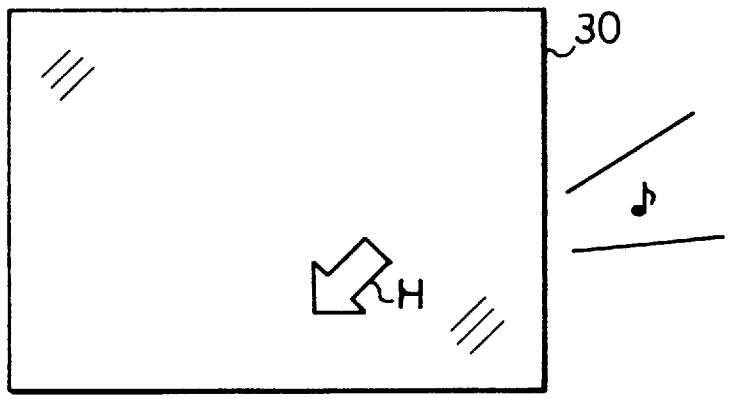
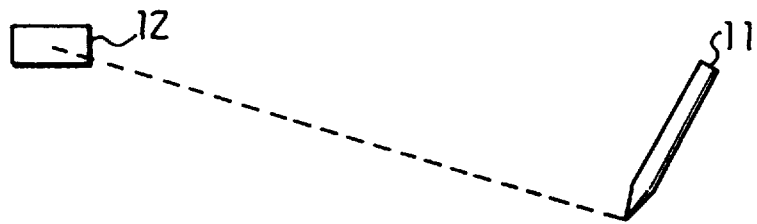

FIG.15
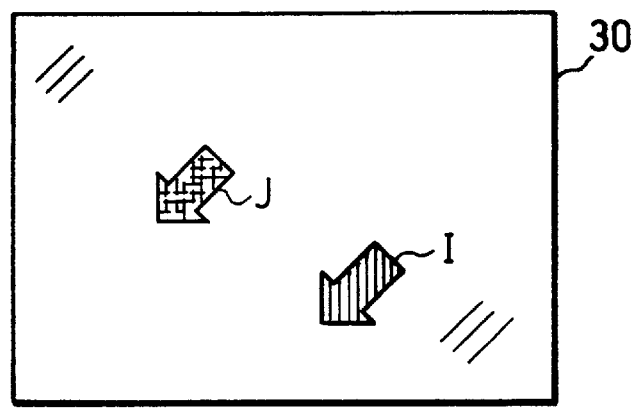
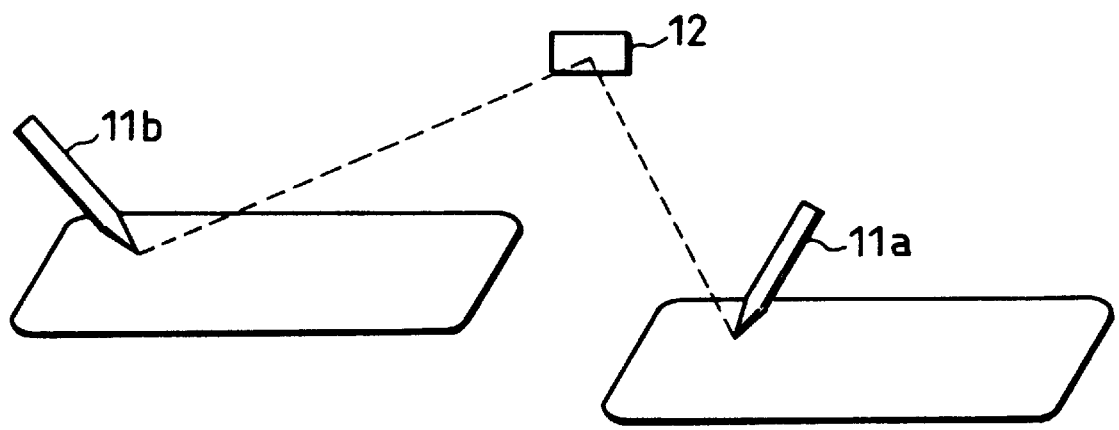

FIG.17
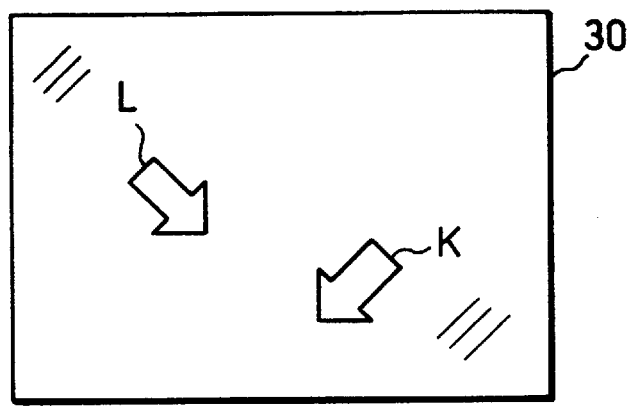
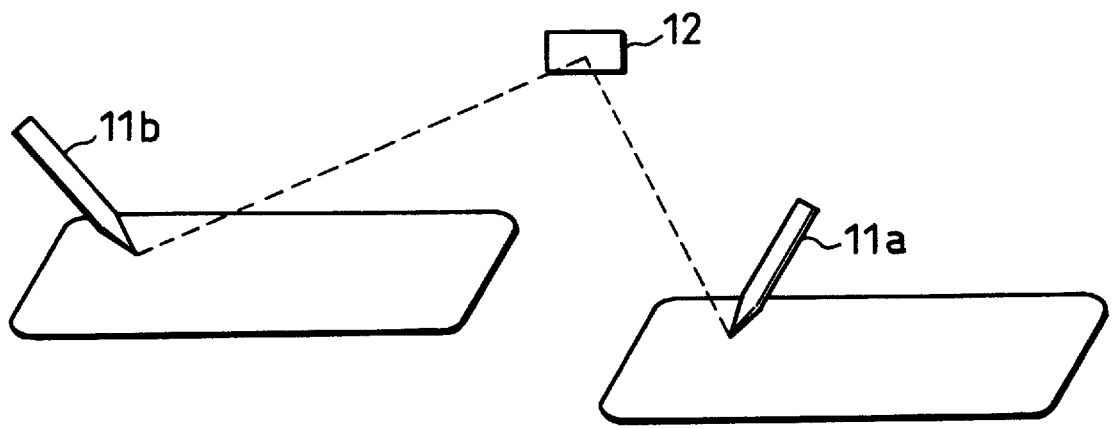

FIG.19
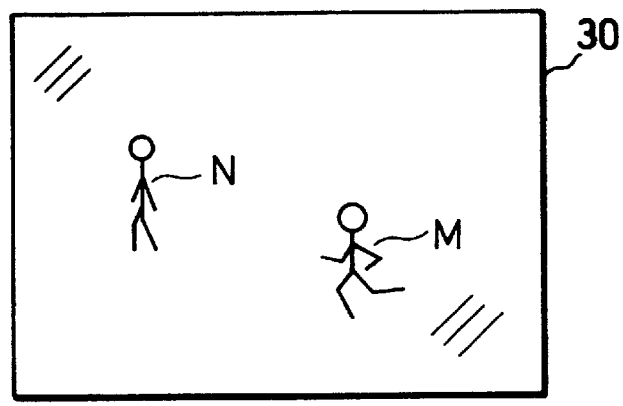
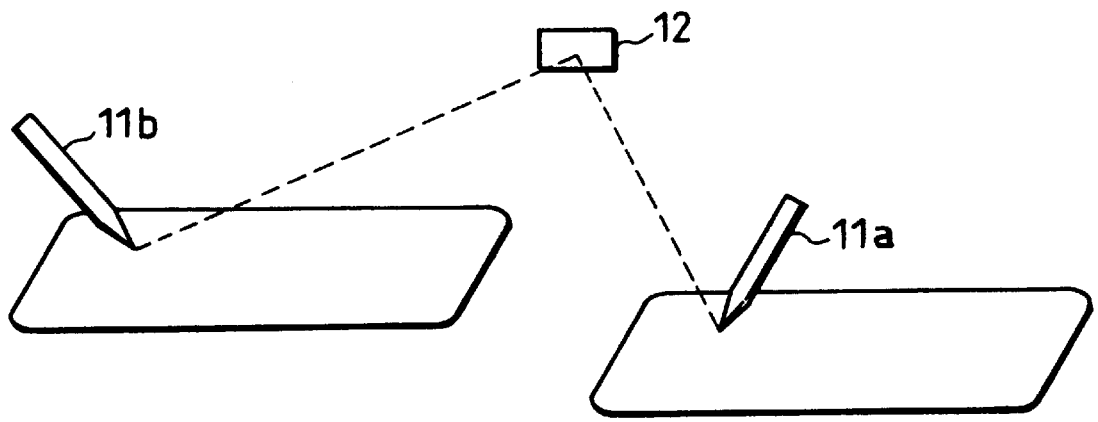

FIG. 21
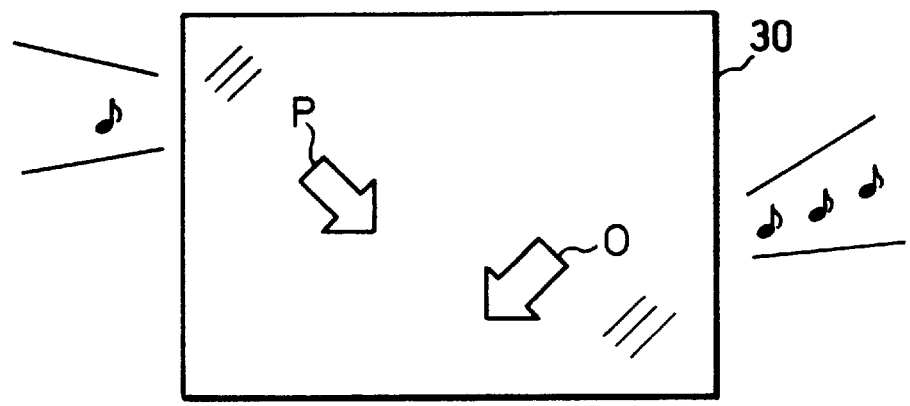
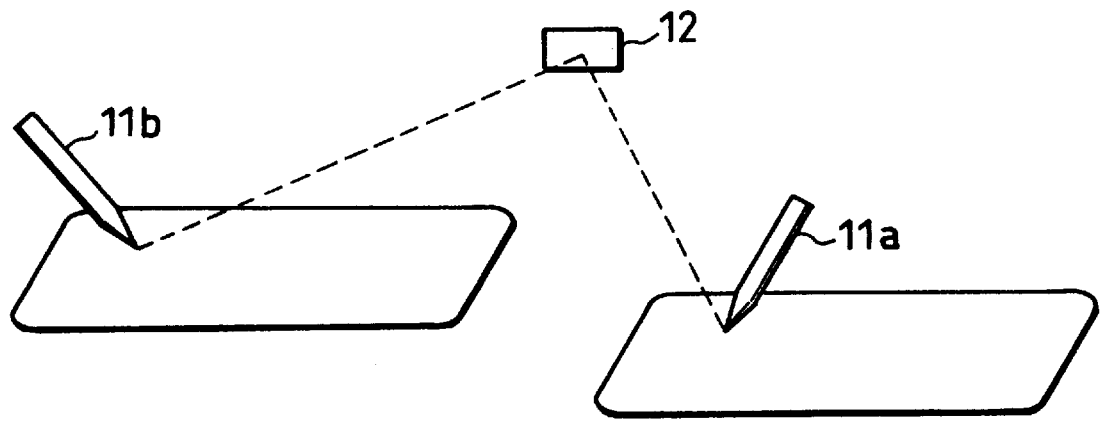

DATA INPUT UNIT

FIELD OF THE INVENTION

The present invention relates to a data input unit which inputs data in a designated position into a processor system such as a personal computer, an electronic pocket notebook and a portable terminal.

BACKGROUND OF THE INVENTION

Conventionally, in the case where characters and graphics are developed on a screen, two-dimensional position information as base data is occasionally inputted into a processor system such as a personal computer, an electronic pocket notebook and a portable terminal. As a tool which can input such two-dimensional position information as data, a mouse or a tablet is generally used.

Meanwhile, three-dimensional graphics, conducting of a musical performance, etc. using a processor system require a spatial position information. For example, in the case of the conducting of a musical performance, movement of a baton by a conductor should be recognized, and thus three-dimensional position information corresponding to a spatial position of the baton is inputted as data. As an example of such a technique, Japanese Unexamined Patent Publication No. 3-210622/1991 (Tokukaihei 3-210622) discloses a three-dimensional position data input method using light and supersonic waves for recognizing a three-dimensional position of the baton.

The above three-dimensional position data input method uses a baton as an input device. The baton is provided with a luminescent element at one end and a supersonic wave generator, which synchronizes with turning on and off of the luminescent element so as to generate supersonic waves intermittently, adjacently to the luminescent element. Moreover, a detecting unit is provided with three supersonic wave sensors and one light receiving element.

In such an arrangement, respective distances between the baton and the three supersonic wave sensors are calculated by a time difference between time at which a light is received from the luminescent element and time at which the three supersonic wave sensors receive supersonic waves. Therefore, the point position of the baton can be obtained by obtaining a coordinate of the intersection of three spherical surfaces whose radiuses are respectively the above three distances.

However, in the case where the data are directly inputted into an output unit adopting the two-dimensional position data input method by the three-dimensional position data input method, only two-dimensional coordinate information can be used for conversion from three dimension into two-dimension. For this reason, lack of information for one dimension occurs.

In addition, if data are inputted from a plurality of input units, the detecting unit can detect these data respectively, but the output unit adopting a two-dimensional position data input method cannot display plural pieces of position information indicated by the input units as different position information. Namely, plural pieces of three-dimensional position information obtained from a plurality of input units can be displayed on the two-dimensional screen as information, but the operator cannot judge which input unit outputs one piece of three-dimensional position information.

SUMMARY OF THE INVENTION

It is an object of the present invention to provide a data input unit which is capable of recognizing data inputted by the three-dimensional position data input method as three-dimensional position information in a detecting unit and converting the information into two-dimensional coordinate and height information so that an operator can confirm a distance between an input unit and a detecting unit on an output unit.

It is another object of the present invention to provide a data input unit, which is capable of recognizing data inputted by the three-dimensional position data input method as three-dimensional position information in a detecting unit and converting plural data inputted from a plurality of input units by the three-dimensional position data input method, respectively into two-dimensional coordinate and height information so that an operator can discriminate the outputted information as information of each input unit on an output unit.

In order to achieve the above objects, a data input unit of the present invention includes:

an input unit for indicating an arbitrary spatial position;

a detecting unit for detecting three-dimensional position information corresponding to the spatial position as an absolute coordinate from said detecting unit;

a processing unit including an operating section for converting the three-dimensional position information into position information represented by a coordinate in a specific plane and a height in an axial direction perpendicularly intersecting to the plane, a memory section for storing the position information converted by the operating section, and an I/O section for outputting display information which is changed according to a size of the height information taken out from the memory section; and an output unit for displaying the spatial position of the input unit based upon the display information from the processing unit.

In accordance with the above arrangement, the three-dimensional position information of the input unit is detected by the detecting unit as the absolute coordinate from the detecting unit. The three-dimensional position information is converted into position information represented by a coordinate in a specific plane and a height with respect to the plane by the operating section in the processing unit so as to be stored in the memory section. Then, the converted position information is processed in the I/O section so as to be displayed on the output unit.

At this time, a distance between the input unit and the detecting unit can be calculated from the three-dimensional position information. Further, since the display is changed according to a size of the height information, an operator can judge a distance between the input unit and the detecting unit visually. Namely, a relative position of the input unit can be easily confirmed on the screen of the unit adopting the two-dimensional position data input method such as a personal computer, an electronic pocket notebook and a portable terminal. Moreover, since the position of the input unit can be confirmed, the loss of the input unit can be prevented. In the case where the three-dimensional position information is detected by using supersonic waves and radio waves, the input possible range is limited, thereby making it possible to detect the input possible range visually.

In order to achieve the above objects, another data input unit of the present invention includes:

an input unit for indicating an arbitrary spatial position;

a detecting unit for detecting three-dimensional position information corresponding to the spatial position as an absolute coordinate from said detecting unit;

a processing unit including an operating section for converting the three-dimensional position information into position information represented by a coordinate in a specific plane and a height in an axial direction perpendicularly intersecting to the plane, a memory section for storing the position information converted by the operating section, and an I/O section for outputting information including sound data which is changed according to a size of the height information taken out from the memory section; and an output unit for displaying the spatial position of the input unit and outputting a sound based upon the information from the processing unit.

In accordance with the above arrangement, since a sound is changed according to the size of the height information, an operator can judge the distance between the input unit and the detecting unit aurally. Therefore, a relative position of the input unit can be easily confirmed without watching the screen of the output unit. Moreover, since the position of the input unit can be confirmed, the loss of the input unit can be prevented. In the case where the three-dimensional position information is detected by using supersonic waves and radio waves, the input possible range is limited, thereby making it possible to detect the input possible range aurally.

In order to achieve the above objects, still another data input unit of the present invention includes:

a plurality of input units for respectively indicating arbitrary spatial positions;

a detecting unit for detecting plural pieces of three-dimensional position information corresponding to the spatial positions designated by the input units as an absolute coordinate from said detecting unit;

a processing unit including an operating section for converting the three-dimensional position information into position information represented by a coordinate in a specific plane and a height in an axial direction perpendicularly intersecting to the plane, a memory section for storing the position information converted by the operating section, and an I/O section for outputting display information which is changed according to a change in the position information taken out from the memory section; and an output unit for displaying the spatial positions designated by the input units based upon the display information from the processing unit.

In accordance with the above arrangement, the three-dimensional position information of the input unit is detected by the detecting unit as an absolute coordinate from said detecting unit. At this time, since a plurality of the input units exist, plural pieces of three-dimensional position information can be obtained. These plural pieces of three-dimensional position information are converted into position information represented by a coordinate in a specific plane and a height with respect to the plane by the operating section of the processing unit, and are stored in the memory section. Then, the converted position information is processed in the I/O section so as to be displayed on the output unit.

At this time, since the display is changed according to the plural pieces of three-dimensional position information, an operator can judge the position information per input unit on the output unit visually. Namely, the input data from a plurality of input units can be easily judged on the screen of the unit adopting the two-dimensional position data input method such as a personal computer, an electronic pocket notebook and a portable terminal. Moreover, since plural pieces of position information can be discriminated simultaneously, a plurality of operators can perform an input operation simultaneously. For this reason, the data input unit of the present invention can be widely applied to a meeting system using a personal computer.

Still another data input unit of the present invention includes:

a plurality of input units for respectively indicating arbitrary spatial positions;

a detecting unit for detecting plural pieces of three-dimensional position information corresponding to the spatial positions designated by the input units as an absolute coordinate from said detecting unit;

a processing unit including an operating section for converting the three-dimensional position information into position information represented by a coordinate in a specific plane and a height in an axial direction perpendicularly intersecting to the plane, a memory section for storing the position information converted by the operating section, and an I/O section for outputting information including sound data which is changed according to a change in the position information taken out from the memory section; and an output unit for displaying the spatial positions of the input units and outputting sounds based upon the information from the processing unit.

In accordance with the above arrangement, since the sound is changed according to the plural pieces of three-dimensional position information, an operator can judge information per input unit on the output unit aurally. Therefore, input data from a plurality of the input units can be easily discriminated without watching the screen of the output unit. Moreover, since plural pieces of position information can be discriminated simultaneously, a plurality of operators can perform the input operation simultaneously.

In addition, one display or sound is outputted for one piece of position information, but the display or sound can be outputted from results of analyzing plural pieces of position information. In the case where, for example, a plurality of sending sections are provided to one pen-like input unit (i.e., pen), not only the distance between the pen and the detecting unit but also information such as inclination of the pen (up-and-down direction) and a shape of the pen can be inputted as data. As a result, the operator can discriminate the information visually and aurally.

For fuller understanding of the nature and advantages of the invention, reference should be made to the ensuing detailed description taken in conjunction with the accompanying drawings.

BRIEF DESCRIPTION OF THE DRAWINGS

FIG. 3 is a flow chart which shows an operation of the data input unit.

FIG. 4(*b*) is an explanatory drawing which shows a relationship between the spatial information and a reference plane.

FIG. 5(*a*) is an explanatory drawing which shows a display state of a display section in the data input unit in the case where a distance between the detecting unit and the input unit is short; and FIG. 5(b) is an explanatory drawing which shows a display state of the display section in the data input unit in the case where the distance between the detecting unit and the input unit is long.

FIG. 6 is a flow chart which shows an operation of the data input unit according to embodiment 2 of the present invention.

FIG. 7(a) is an explanatory drawing which shows a display state of the display section in the data input unit in the case where the distance between the detecting unit and the input unit is short; and FIG. 7(b) is an explanatory drawing which shows a display state of the display section in the data input unit in the case where the distance between the detecting unit and the input unit is long.

FIG. 8 is a flow chart which shows an operation of the data input unit according to embodiment 3 of the present invention.

FIG. 9(a) is an explanatory drawing which shows a display state of the display section in the data input unit in the case where the distance between the detecting unit and the input unit is short; and FIG. 9(b) is an explanatory drawing which shows a display state of the display section in the data input unit in the case where the distance between the detecting unit and the input unit is long.

FIG. 10 is a flow chart which shows an operation of the data input unit according to embodiment 4 of the present invention.

FIG. 11(a) is an explanatory drawing which shows a display state of the display section in the data input unit in the case where the distance between the detecting unit and the input unit is short; and FIG. 11(b) is an explanatory drawing which shows a display state of the display section in the data input unit in the case where the distance between the detecting unit and the input unit is long.

FIG. 15 is an explanatory drawing which shows a display state of the display section in the data input unit.

FIG. 17 is an explanatory drawing which shows a display state of the display section in the data input unit.

FIG. 19 is an explanatory drawing which shows a display state of the display section in the data input unit.

FIG. 21 is an explanatory drawing which shows a display state of the display section in the data input unit.

DETAILED DESCRIPTION OF THE PREFERRED EMBODIMENTS

EMBODIMENT 1

The following describes the first embodiment of the present invention with reference to the drawings.

The description here relates to the case where the a data input unit is applied to a personal computer.

Figure 2:
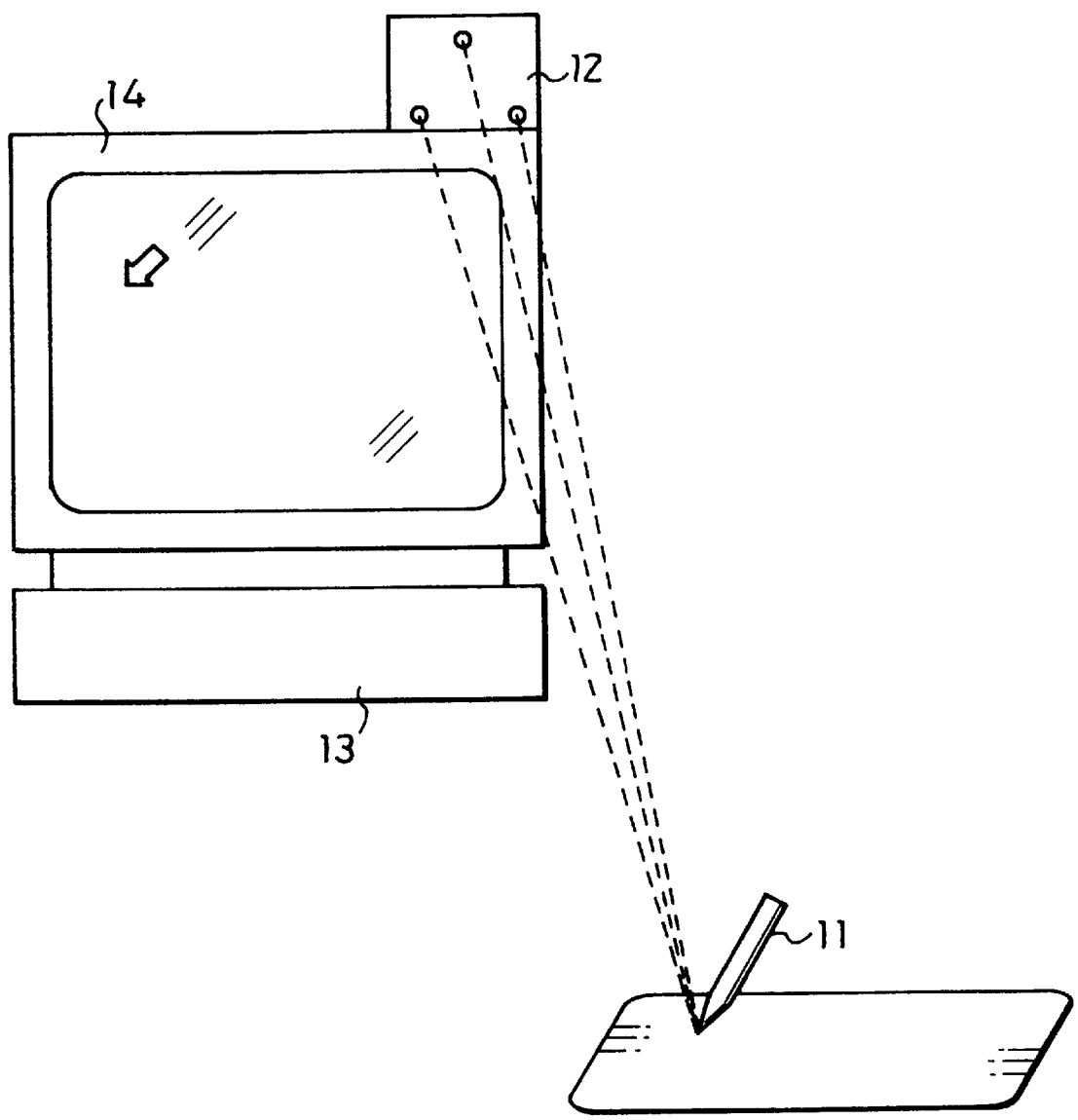
FIG. 2 is an outward view which shows an arrangement of a personal computer adopting the data input unit.

As shown in FIG. 2, the personal computer has an input unit 11, a detecting unit 12, a processing unit 13 and an output unit 14.

The input unit 11 is, for example, a pen-type pointing device, and it indicates an arbitrary spatial position (three-dimensional position). The detecting unit 12 detects the arbitrary spatial position indicated by the input unit 11 as three-dimensional position information and stores the detected three-dimensional position information which is an absolute coordinate from the detecting unit 12.

The processing unit 13 converts the three-dimensional position information into coordinate information in a specific plane and height information in an axial direction which intersect perpendicularly to the plane, and executes the process for display based upon the coordinate information and the height information. Moreover, the processing unit 13 also stores the converted three-dimensional position information and stroke data. The output unit 14 displays data based upon display information which was subject to the process for display via the processing unit 13.

In FIG. 2, three dotted lines which connect the input unit 11 to the detecting unit 12 represent communicating means such as supersonic waves and radio waves, and coordinates of arbitrary points in space are determined by distances from at least three arbitrary points (four points when discrimination is exercised between positive and negative).

Figure 1:
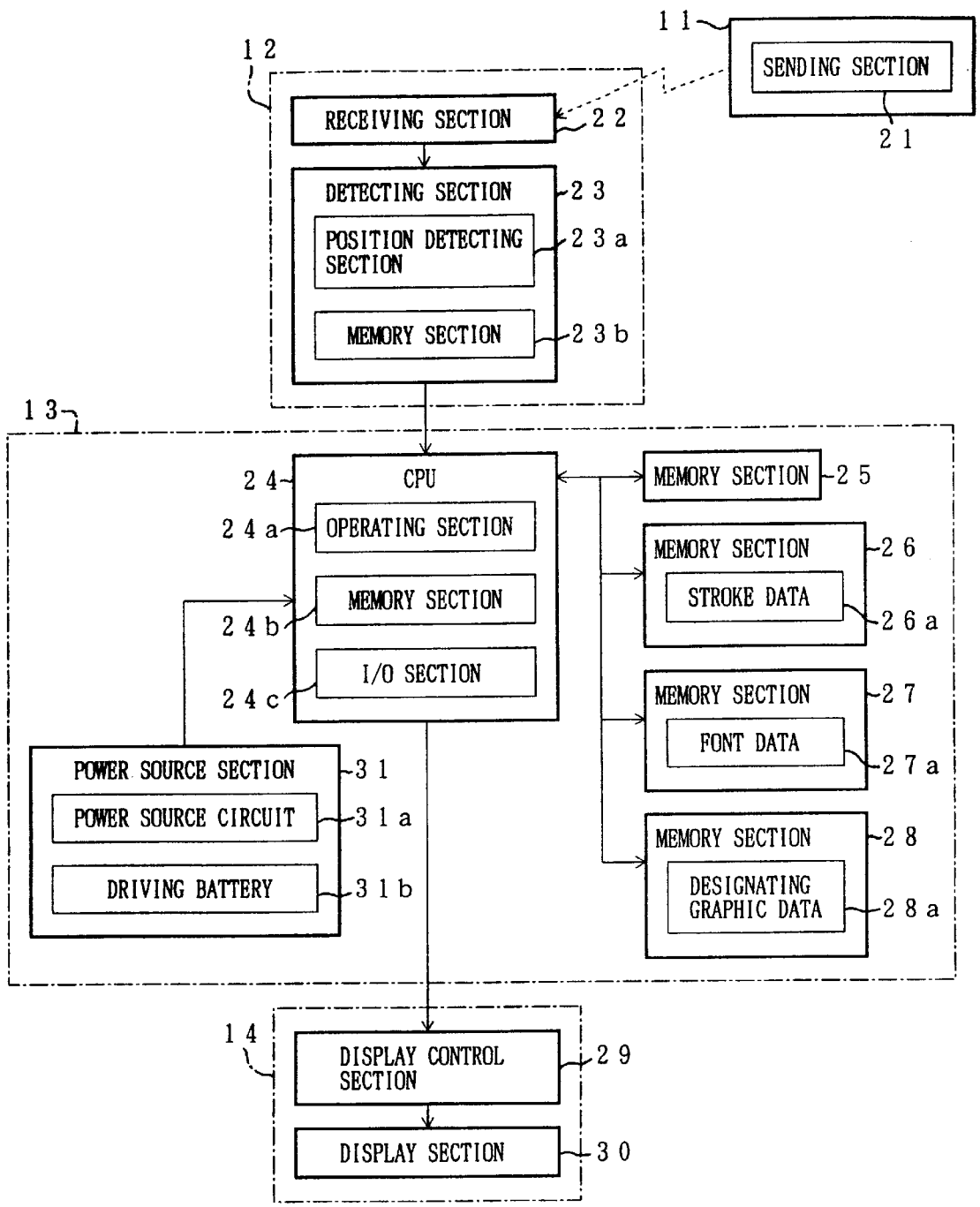
FIG. 1 is a block diagram which shows an arrangement of a data input unit according to embodiment 1 of the present invention.

The following describes an arrangement of the data input unit with reference to the block diagram of FIG. 1.

The pen-type pointing device as the input unit 11 has a sending section 21 which is capable of sending supersonic waves and radio waves in the point of a pen. When an operator performs an input operation, the sending section 21 sends supersonic waves and radio waves.

The detecting unit 12 is composed of a receiving section 22 and a detecting section 23. The receiving section 22 receives the supersonic waves and radio waves sent from the sending section 21. A position detecting section 23a in the detecting section 23 detects three-dimensional position information (i.e., position information) corresponding to an arbitrary spatial position based upon the supersonic waves and radio waves received by the receiving section 22, and a memory section 23b in the detecting section 23 stores the position information.

The processing unit 13 is composed of a CPU 24, four memory sections 25 through 28 and a power source section 31. An operating section 24a in the CPU 24 takes out the arbitrary position information stored in the memory section 23b and converts it into coordinate information in a specific plane (plane position) and height information in an axial direction which intersect perpendicularly to the plane. The memory section 25 stores the converted plane position and the height information. Namely, in the case where the input unit 11 is moved arbitrarily so that a pattern is drawn in space, the pattern is converted into a pattern in a specific plane, and the converted pattern is stored in the memory section 25. Here, a memory section 24b is used at the time of the operation in the CPU 24.

When recognition of stroke data, which are data of a previous pattern recognized as characters in input of handwriting characters, is necessary at this time, the operating section 24a recognizes the pattern stored in the memory section 25 as stroke data, and compares it with stroke data 26a stored in the memory section 26. If font data is necessary according to the compared result, font data 27a stored in the memory section 27 are used.

In addition, as for a designating graphic which represents a designated position on the display screen, designating graphic data 28a stored in the memory section 28 are used. The designating graphic data 28a have color data (hue, saturation and lightness) of the designating graphic.

An I/O section 24c in the CPU 24 executes the process for displaying the data obtained from the memory sections 25 through 28 so as to output display information. At this time, the designating graphic data 28a are changed based upon the height information stored in the memory section 25 so as to be outputted.

The power source section 31 is composed of a power source circuit 31a and a driving battery 31b, and supplies a power source to all the units.

The output unit 14 is composed of a display control section 29 such as an LCD (liquid crystal display) driver, and a display section 30 such as LCD. The display control section 29 controls data based upon the display information obtained by the I/O section 24c so that the processed data are displayed on a display section 30.

The operation of the data input unit having the above arrangement is explained with reference to the flow chart of FIG. 3.

First, at step (i.e., S) 1, three-dimensional position information is inputtted by the input unit 11 and the detecting unit 12. The position information is retained in the memory section 23b in the detecting unit 12 (S2). Then, the position information is converted into the coordinate information in a specific reference plane and height information with respect to the reference plane (S3). The converted coordinate information and height information are retained in the memory section 25 in the processing unit 13 (S4). The designating graphic data are processed so that the color of the designating graphic (hue, saturation and lightness) of the designating graphic is changed based upon the height information retained at S4 (S5). The output unit 14 displays the designating graphic based upon the data processed at S5 (S6).

For example, as shown in FIG. 5(a), a relative position of the input unit 11 in the plane is represented by a position of the screen where graphic A is displayed. As a result, an operator can recognize the relative position of the input unit 11 in the plane on the screen. If a distance between the input unit 11 and the detecting unit 12 is enlarged without changing the position of the input unit 11 in the plane which is relatively represented by the graphic A, the designating graphic on the screen is not changed when a conventional input unit is used. However, in the data input unit of the present invention, a change in the distance between the input unit 11 and the detecting unit 12 can be represented by a change in density of colors as shown in FIG. 5(b).

Namely, as shown in FIG. 5(a), when the distance between the detecting unit 12 and the input unit 11 is short, the output unit 14 displays, for example, the graphic A with a color of a designating graphic being deep. Meanwhile, as shown in FIG. 5(b), when the distance between the detecting unit 12 and the input unit 11 is long, the output unit 14 displays graphic B with a color of the designating graphic being light. Namely in this case, a change in the distance between the two units 11 and 12 is represented by a change in the shade of the color of designating graphics.

The positional relationship between the input unit 11 and the detecting unit 12 is such that coordinate information in the reference plane is the same and the height information is different. For this reason, although the graphic A and the graphic B are displayed on the same position of the display section 30, their shades of the colors are different.

As mentioned above, the spatial position designated by the input unit 11 can be relatively represented by the position of a designating graphic on the screen and the change in the color of the designating graphic.

The following describes the conversion of the three-dimensional position information at S3.

Figure 4A:
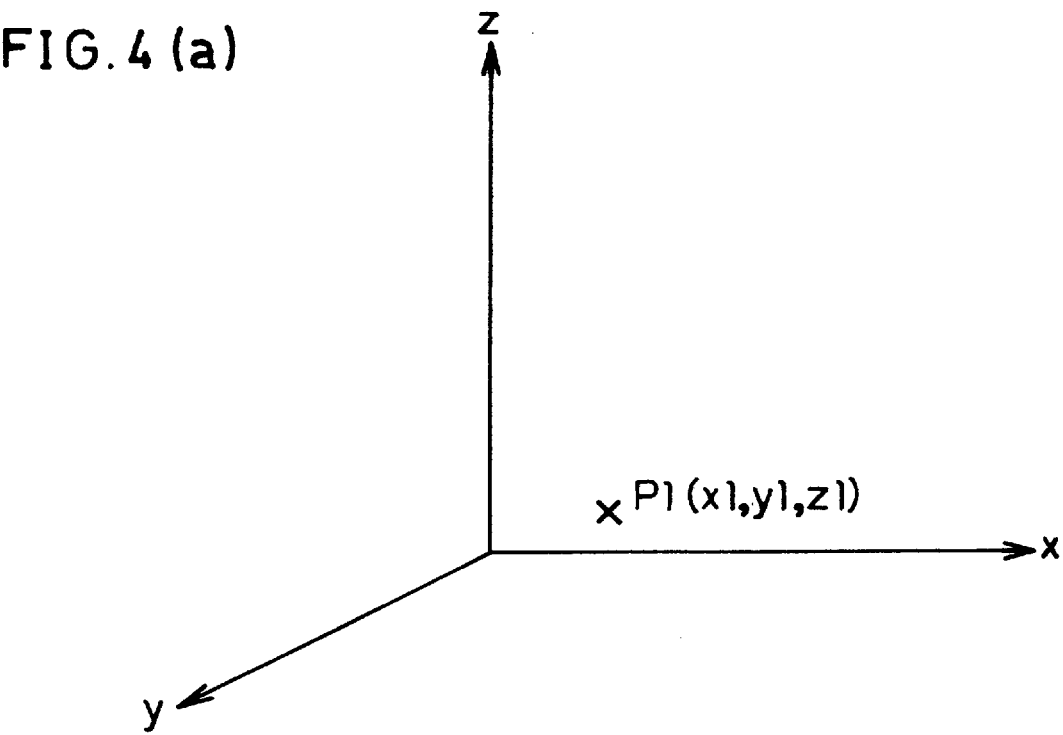
FIG. 4(*a*) is an explanatory drawing which shows arbitrary spatial information.
Figure 4B:
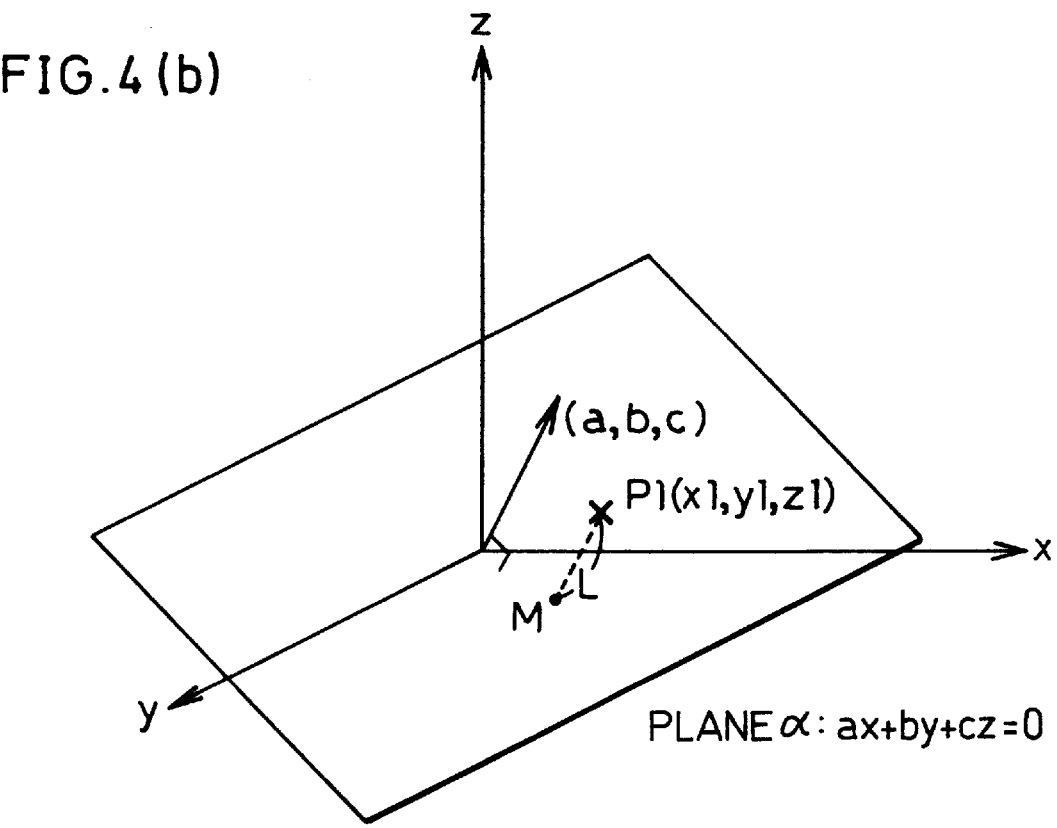

For example, as shown in FIG. 4(a), if a point P1 (x1, y1, z1) which is three-dimensional position information as an absolute coordinate from the detecting unit 12 in an arbitrary spatial position is inputted, as shown in FIG. 4(b), a distance L between the point P1 and a plane α is represented as follows:

$$L=|ax1+by1+cz1|/(a^2+b^2+c^2)^{1/2}$$

where α is a specific reference plane (α: ax+by+cz=0).

In addition, since a normal vector of the specific reference plane is represented by (a, b, c), a straight line is drawn through the point P1 and a point (x1-a, y1-b, z1-c) vertically to the plane α. As a result, a point which was obtained by converting the point P1 on the plane α (i.e., converted point) can be obtained as an intersection M of the perpendicular line, which is drawn from the point P1 to the plane α, and the plane α.

As a result, the three-dimensional position information (point P1) can be converted into coordinate information of the converted point (intersection M) on the specific reference plane and height (distance L) information in the axial direction which perpendicularly intersects the plane. The specific reference plane which is required at S3 may be initially set according to coordinates of at least three points in space before input of data.

As mentioned above, the data input unit of the present embodiment converts three-dimensional position information which is an absolute coordinate from the detecting unit into coordinate information and height information with respect to a reference plane which is previously determined arbitrarily, and changes designating graphic data based upon the height information so as to display the data. Therefore, an operator can judge the distance between the detecting unit and the input unit visually and relatively, thereby making it possible to easily confirm the relative position of the input unit on the screen of a unit adopting the two-dimensional position data input method, such as a personal computer, an electronic pocket notebook and a portable terminal. Moreover, since the position of the input unit can be confirmed, it is possible to prevent loss of the input unit. Further, if supersonic waves and radio waves are used in the detecting unit, since an input possible range is limited, the input possible range can be detected visually in the input unit of the present embodiment.

In addition, if the data input unit of the present embodiment is utilized for computer games, etc., contents of the games can be controlled by position information of the input unit and detecting unit. For example, the data input unit of the present invention is used for a game which is played by moving a character. In this case, three-dimensional position information of the input unit is detected and is converted into two-dimensional position information and height information. A position of the character as a display graphic on a screen is changed according to a change in the two-dimensional position information, and a color of the character is changed according to a change in the height information. As a result, an operator can not only move the character on the screen but also display a plurality of representations such as an offense and a defense and a change in an expression by one input unit. Therefore, advanced and realistic games and amusing and understandable games can be produced.

Further, since the color of the designating graphic is changed on the output unit, hue, saturation and lightness of the designating graphic on the screen vary accordingly to the distance between the input unit and the detecting unit. For example, in the case where an operator is color-blind, it is difficult for the operator to discriminate a change in hue. However, when lightness is changed, the operator can discriminate a relative distance between the detecting unit and the input unit on the screen easily.

EMBODIMENT 2

The following describes the second embodiment of the present invention with reference to the drawings. Here, for convenience of explanation, those members that have the same arrangement and functions, and that are described in the aforementioned embodiment are indicated by the same reference numerals and the description thereof is omitted.

In the data input unit of the present embodiment, the designating graphic data 28a in the memory section 28 are changed from color data (hue, saturation and lightness) of the designating graphic into shape data (size, direction, design, etc.) of the designating graphic.

The operation of the data input unit having the above arrangement is explained on reference to the flow chart of FIG. 6.

First, the converting process for the three-dimensional position information described in embodiment 1 is performed in the same manner as S1 through S4 (S21). In order to change the size, direction and design of the designating graphic based upon retained height information, designating graphic data are processed (S22). The output unit 14 displays the designating graphic based upon the data processed at S22 (S23).

For example, as shown in FIG. 7(*a*), a relative position of the input unit 11 in the plane is represented by a position where graphic C is displayed on the screen. If the distance between the input unit 11 and the detecting unit 12 is made longer without changing the position of the input unit 11 in the plane which is relatively represented by the graphic C, the change in the distance between the input unit 11 and the detecting unit 12 can be represented by a change in the size of the designating graphic as shown in FIG. 7(*b*).

In other words, as shown in FIG. 7(*a*), in the case where the distance between the input unit 11 and the detecting unit 12 is short, the output unit 14 displays the designating graphic with its size being enlarged like the graphic C. Meanwhile, as shown in FIG. 7(*b*), in the case where the distance between the input unit 11 and the detecting unit 12 is long, the output unit 14 displays the designating graphic with its size being decreased like a graphic D. Namely, in this case, the distance between the two units is represented by the size of the designating graphic.

As mentioned above, the data input unit of the present embodiment can relatively show the spatial position indicated by the input unit based upon the position of a designating graphic on the screen and the change in the size of the designating graphic. Namely, on the output unit, the size, direction and design of the designating graphic on the screen are change according to the distance between the input unit and the detecting unit. As a result, in the case, where a design such as a portrait, for example, is changed, interests and intellectual curiosity of an operator can be improved.

EMBODIMENT 3

The following describes the third embodiment of the present invention with reference to the drawings. Here, for convenience of explanation, those members that have the same arrangement and functions, and that are described in the aforementioned embodiments are indicated by the same reference numerals and the description thereof is omitted.

In the data input unit of the present embodiment, the designating graphic data 28a in the memory section 28 are used by adding shape data (size, direction, design, etc.) of the designating graphic to color data (hue, saturation and lightness) of the designating graphic. At this time, the shape data of the designating graphic are previously stored as a plurality of designating graphic patterns. The CPU 24 processes the designating graphic patterns so that they are successively displayed one by one, and displays the shapes of the designating graphics on the display section 30 as a series of patterns.

The operation of the data input unit having the above arrangement is explained with reference to the flow chart of FIG. 8.

First, the converting process for the three-dimensional position information described in embodiment 1 is performed in the same manner as S1 through S4 (S31). In order to change the shape such as the size, direction and design of the designating graphic into a series of patterns based upon retained height information, designating graphic data are processed (S32). The output unit 14 displays the designating graphic based upon the data processed at S32 (S33).

For example, as shown in FIG. 9(*a*), a relative position of the input unit 11 in the plane is represented by a position where graphic E is displayed on the screen. If the distance between the input unit 11 and the detecting unit 12 is made longer without changing the position of the input unit 11 in the plane which is relatively represented by the graphic E, the change in the distance between the input unit 11 and the detecting unit 12 can be represented by a change in a series of patterns of the designating graphic as shown in FIG. 9(*b*).

In other words, as shown in FIG. 9(*a*), in the case where the distance between the input unit 11 and the detecting unit 12 is short, the output unit 14 displays the graphic E in a fixed position of the screen of the display section 30. The graphic E represents a state of a running human being and is a series of animation showing the change in shape. Meanwhile, as shown in FIG. 9(*b*), in the case where the distance between the input unit 11 and the detecting unit 12 is long, the output unit 14 displays a graphic F as the designating graphic in the same position of the display section 30. Here, the designating graphic can change a series of patterns and a color.

As mentioned above, since a design such as a portrait can be used as designating graphics which are animation of a series of patterns in the data input unit of the present embodiment, interest and intellectual curiosity of an operator can be further improved. Moreover, for example, in the case where the input unit is near the detecting unit, the movement of a design is sped up. In other words, when an interval of changing a series of patterns is changed according to the distance between the input unit and the detecting unit, the distance between the units can be judged with respect to the time axis, namely, can be judged by the speed of the change in the display of the designating graphic.

EMBODIMENT 4

The following describes the fourth embodiment of the present invention with reference to the drawings. Here, for convenience of explanation, those members that have the same arrangement and functions, and that are described in the aforementioned embodiments are indicated by the same reference numerals and the description thereof is omitted.

An arrangement of the data input unit of the present embodiment is changed so that display information is outputted by a sound. For this reason, in the I/O section 24c of the CPU 24, a sound is changed according to the size of the height information, and a speaker which outputs a sound is added to the output unit 14.

The operation of the data input unit having the above arrangement is described with reference to the flow chart of FIG. 10.

First, the converting process for three-dimensional position information described in embodiment 1 is performed in the same manner as S1 through S4 (S41). Data for changing a sound, such as a frequency, volume, chord and interval of a sound, are processed based upon the retained height information (S42). A sound is outputted from the speaker based upon the data processed at S42 (S43), and a designating graphic is displayed (S44).

For example, as shown in FIG. 11(a), a relative position of the input unit 11 in the plane is represented by a position where a graphic G is displayed on the screen. If the distance between the input unit 11 and the detecting unit 12 is made longer without changing the position of the input unit 11 in the plane which is relatively represented by the graphic G, the change in the distance between the input unit 11 and the detecting unit 12 can be represented by a change in a sound in the designating graphic as shown in FIG. 11(b).

In other words, as shown in FIG. 11(a), in the case where the distance between the output unit 11 and the detecting unit 12 is short, the output unit 14 displays the designating graphic such as the graphic G and beeps three times. Meanwhile, as shown in FIG. 11(b), in the case where the distance between the input unit 11 and the detecting unit 12 is long, the output unit 14 displays the designating graphic such as a graphic H and beeps once.

As mentioned above, since a sound, which is outputted according to the size of the height information, is changed in the data input unit of the present invention, an operator can recognize the distance between the input unit and the detecting unit aurally. Therefore, even if the operator does not watch the screen of the output unit, the operator can confirm the position (height) of the input unit from a reference plane easily. If supersonic waves signals and radio waves are used in the detecting unit, since the input possible range is limited, the input possible range can be detected aurally.

In addition, for example, when plural pieces of sound data to be outputted are prepared, i.e., a scale of a sound is successively changed according to the spatial position of the input unit, interest and understandability and intellectual curiosity can be improved.

In the embodiments 1 through 4, a color and shape of a designating graphic, a successive change in the shape, and a sound are respectively changed, but they may be combined arbitrarily. For example, the shape of the designating graphic can be changed according to the distance between the input unit and the detecting unit, and moreover, a sound can be changed. At this time, the designating graphic and the sound to be outputted may be changed simultaneously according to the size of the height information.

In this case, for example, if the designating graphic is a character such as animals, the designating graphic as a character can move about on the screen while a cry is being changed according to the distance between the input unit and the detecting unit. In such a manner, since the designating graphic and the sound are changed simultaneously by changing the spatial position of the input unit, interest and intellectual curiosity of the operator can be improved. Therefore, the data input unit of the present embodiment can be also applied to computer games, educational processor systems such as CAI systems.

EMBODIMENT 5

The following describes the fifth embodiment of the present invention with reference to the drawings. Here, for convenience of explanation, those members that have the same arrangement and functions, and that are described in the aforementioned embodiments are indicated by the same reference numerals and the description thereof is omitted.

Figure 13:
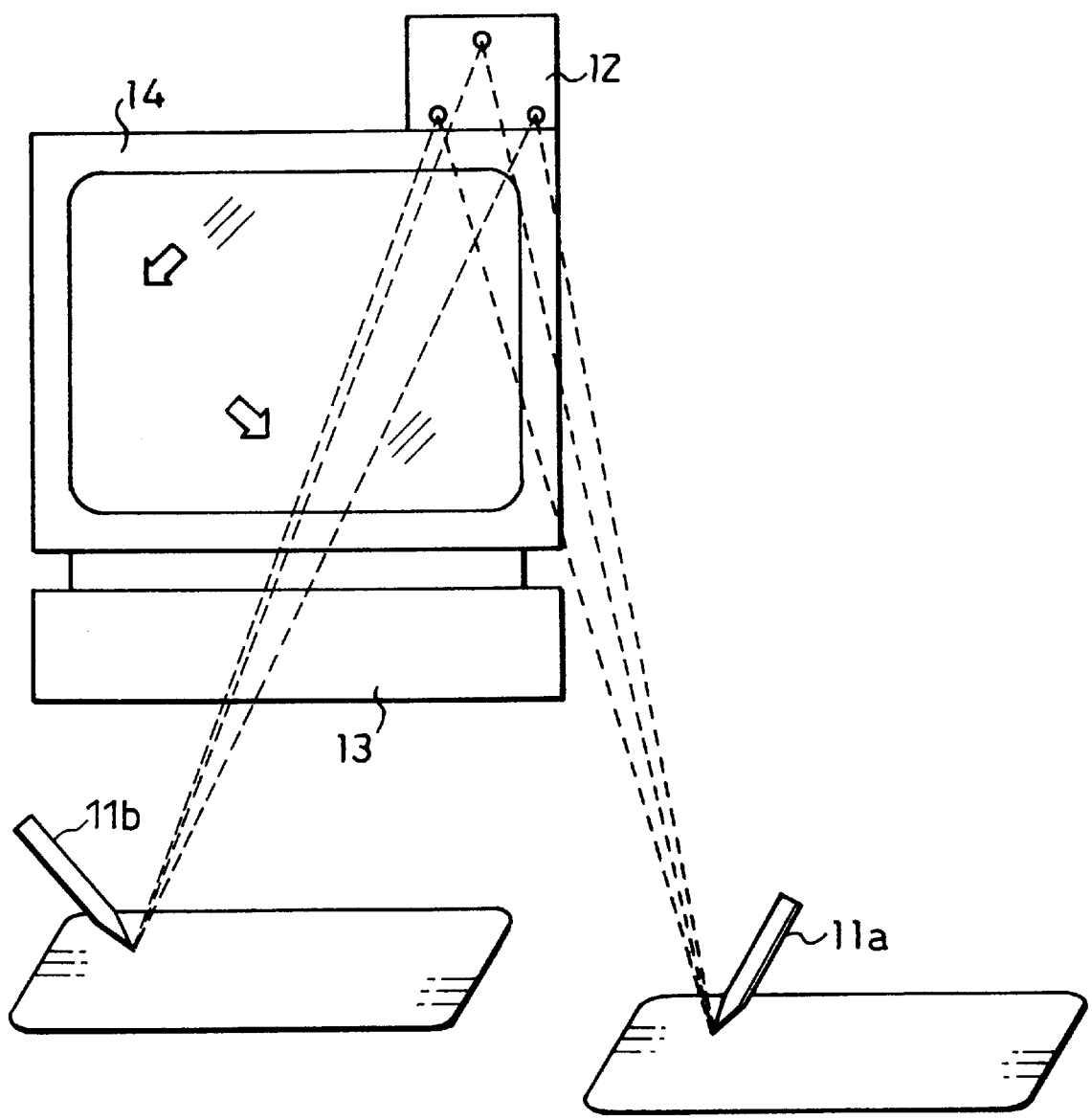
FIG. 13 is an outward view which shows an arrangement of a personal computer adopting the data input unit.

As shown in FIG. 13, the personal computer has input units 11a and 11b, the detecting unit 12, the processing unit 13 and the output unit 14.

The input units 11a and 11b are, for example, pen-type pointing devices and indicate arbitrary spatial positions. The detecting unit 12 judges which input unit indicates the arbitrary spatial position and detects the spatial position as three-dimensional position information. Thereafter, the detecting unit 12 stores the detected three-dimensional position information which is an absolute coordinate from the detecting unit.

The functions of the processing unit 13 and the output unit 14 are the same as those in the aforementioned embodiments.

In FIG. 13, three dotted lines which connect the input units 11a and 11b with the detecting unit 12, as mentioned above, represent communicating means such as supersonic waves and radio waves. Coordinates of arbitrary points in space are represented by distances from at least arbitrary three points (four points when discrimination is exercised between positive and negative).

Figure 12:
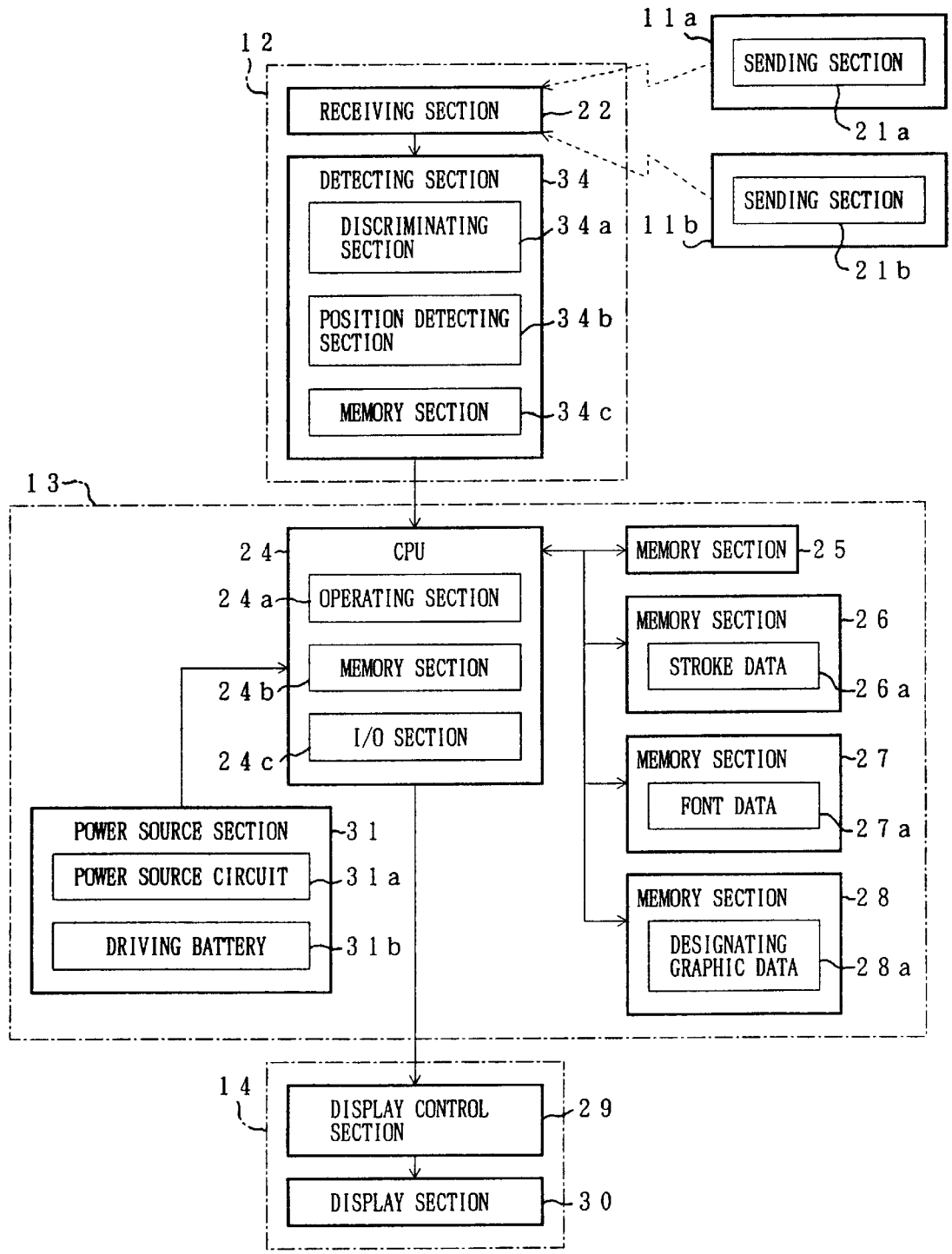
FIG. 12 is a block diagram which shows an arrangement of the data input unit according to embodiment 5 of the present invention.

The following describes the arrangement of the data input unit with reference to the block diagram of FIG. 12.

As to the pen-type pointing devices which are the input units 11a and 11b, the points of the pens respectively have sending sections 21a and 21b which can send supersonic waves and radio waves to the point of the pen. When an operator performs the input operation, the sending sections 21a and 21b transmit different supersonic waves and radio waves.

The detecting unit 12 is composed of the receiving section 22 and a detecting section 34. The receiving section 22 receives the different supersonic waves and radio waves transmitted from the sending sections 21a and 22b. A discriminating section 34a in the detecting section 34 judges the input unit based upon the respective supersonic waves and radio waves having different frequencies received by the receiving section 22. Moreover, a position detecting section 34b in the detecting section 34 detects three-dimensional position information, to be an absolute coordinate from the detecting unit, corresponding to an arbitrary spatial position per input unit, and a memory section 34c in the detecting section 34 stores the position information.

The processing unit 13 is composed of the CPU 24, the four memory sections 25 through 28, and the power source section 31. The operating section 24a in the CPU 24 takes out the arbitrary three-dimensional position information stored in the memory section 34c and converts it into coordinate information in a specific plane (plane position) and height information in an axial direction which intersect perpendicularly to the plane. The memory section 25 stores the converted plane position and the height information.

Namely, in the case where the input units 11a and 11b are moved arbitrarily so that a pattern is drawn in space, the pattern is converted into a pattern in a specific plane, and the converted pattern is stored in the memory section 25. Here, the memory section 24b is used at the time of the operation in the CPU 24.

In the case where stroke data and font data should be recognized, and in the case where data which is used as a designating graphic is required, the data stored in the memory sections 26 through 28 described in embodiment 1 are used. The functions of the output unit 14, the CPU 24 and the power source section 31 were explained in embodiment 1.

Figure 14:
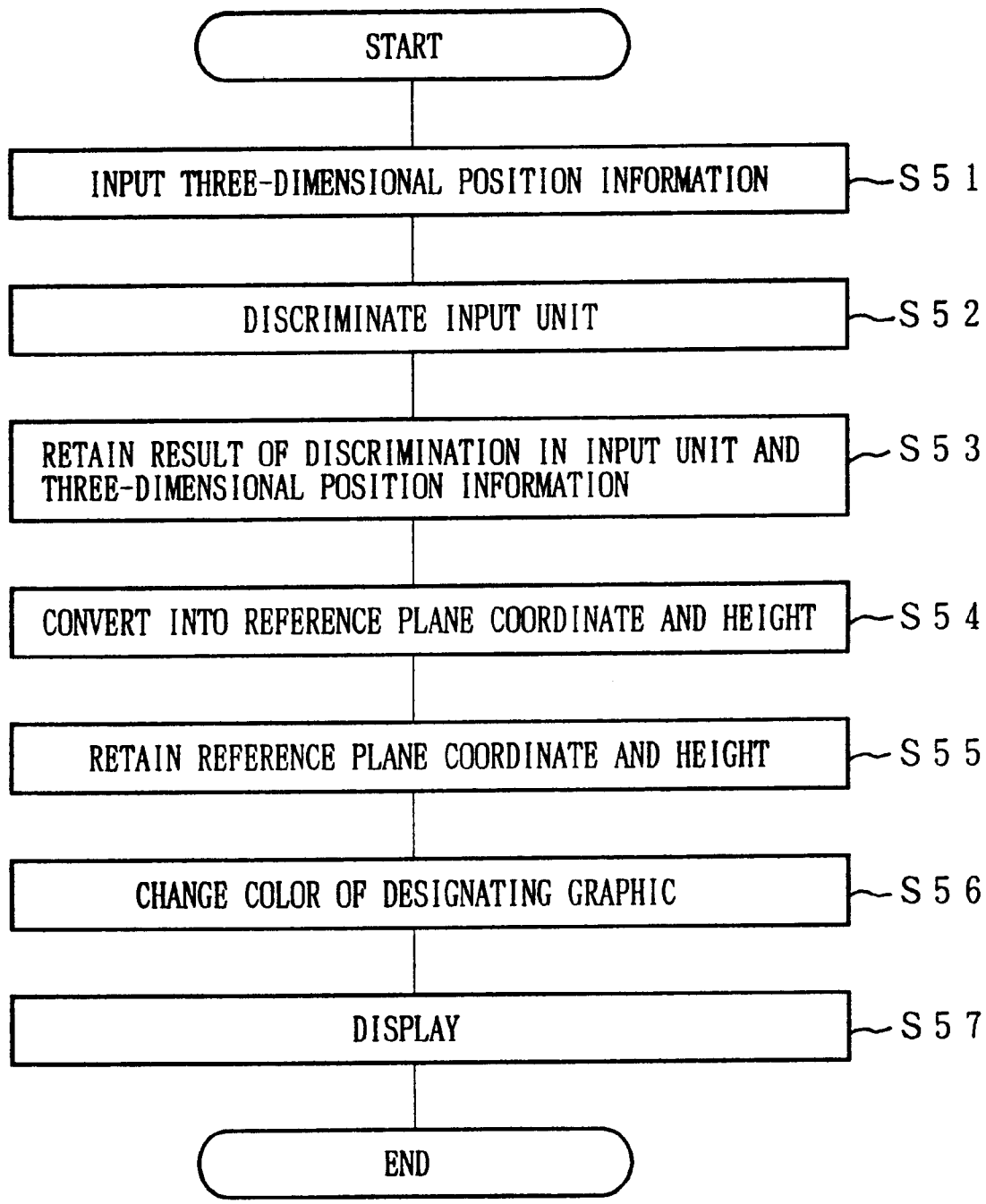
FIG. 14 is a flow chart which shows an operation of the data input unit.

The following describes the operation of the data input unit having the above arrangement with reference to the flow chart in FIG. 14.

First, three-dimensional position information is inputted by the input units 11a and 11b and the detecting unit 12 (S51). At this time, the three-dimensional position information from the respective input units is discriminated by the discriminating section 34a in the detecting unit 12 (S52). The discriminated results and the three-dimensional position information of the input units are retained in the memory section 34c in the detecting unit 12 (S53). Then, the three-dimensional position information is converted into the coordinate information in a specific reference plane and the height information (S54). The converted coordinate information and height information are retained in the memory section 25 in the processing unit 13 (S55). In order to change the color of the designating graphic (hue, saturation and lightness) based upon the results of discriminating the position information retained at S53 and the discriminated height information, the designating graphic data are processed (S56). The output unit 14 displays a designating graphic based upon the data processed at S56 (S57). Here, the three-dimensional position information at S54 is converted in the same manner as embodiment 1.

For example, as shown in FIG. 15, a relationship between relative positions of the input unit 11a and the input unit 11b in the plane is represented by the positions where graphics I and J are displayed on the screen. The discrimination between the input unit 11a and the input unit 11b is represented by a change in hue of the designating graphics, namely, a difference in colors.

In other words, the graphic I showing the relative position of the input unit 11a is displayed in red, for example, whereas the graphic J showing the relative position of the input unit 11b is displayed in yellow, for example. As a result, the input units 11a and 11b can be discriminated clearly on the display screen. Moreover, the change in the distances between the input units 11a and 11b and the detecting unit 12 can be represented by a change in lightness of the designating graphic (not shown).

As mentioned above, the data input unit of the present embodiment is arranged so as to discriminate plural pieces of three-dimensional position information correspondingly to a plurality of input units, convert the discriminated three-dimensional position information into coordinate information in a reference plane which is arbitrarily set and height information in the same manner as embodiments 1 through 4, and change designating graphic data based upon the results of discriminating the position information and the height information so as to display the changed data.

Therefore, on the screen of the unit adopting the two-dimensional position data input method, such as a personal computer, an electronic pocket notebook and a portable terminal, an operator can discriminate a plurality of input units visually from displayed designating graphics, and can judge their positions relatively.

For this reason, in the data input unit of the present embodiment, the input operation can be performed by a plurality of operators simultaneously. Moreover, since the operators respectively can make discrimination on the output units, the data input unit of the present embodiment can be applied to a meeting system using a personal computer.

In addition, in the case where the data input unit is utilized for computer games, etc., even if a plurality of operators perform the input operation simultaneously, the operators can judge current input positions on the display screen visually. For example, in the case where the input unit of the present invention is used for a game which is played by moving a character. In this case, a plural pieces of three-dimensional position information of the input units are detected and are converted into two-dimensional position information and height information. A position of the character as a display graphic on a screen is changed according to a change in the two-dimensional position information, and a color of the character is changed according to a change in the height information. As a result, an operator can not only move the character on the screen but also display a plurality of representations such as an offense and a defense and a change in an expression by one input unit. Moreover, since a plurality of operators can move respective characters, characters can be confronted each other. Therefore, by the data input unit of the present invention, advanced and realistic games and amusing and understandable games can be produced.

Further, since the color of the designating graphic is changed on the output unit, hue, saturation and lightness of the designating graphic on the screen are changed accordingly to plural pieces of three-dimensional position information. For example, in the case where an operator is color-blind, it is difficult for the operator to discriminate a change in hue. However, when lightness is changed and a plurality of input units are respectively discriminated, the operator can judge a three-dimensional position in one input unit by changing the lightness.

EMBODIMENT 6

The following describes the sixth embodiment of the present invention with reference to the drawings. Here, for convenience of explanation, those members that have the same arrangement and functions, and that are described in the aforementioned embodiments are indicated by the same reference numerals and the description thereof is omitted.

In the data input unit of the present embodiment, the designating graphic data 28a in the memory section 28 are changed from color data (hue, saturation and lightness) of the designating graphic into shape data (size, direction, design, etc.) of the designating graphic.

Figure 16:
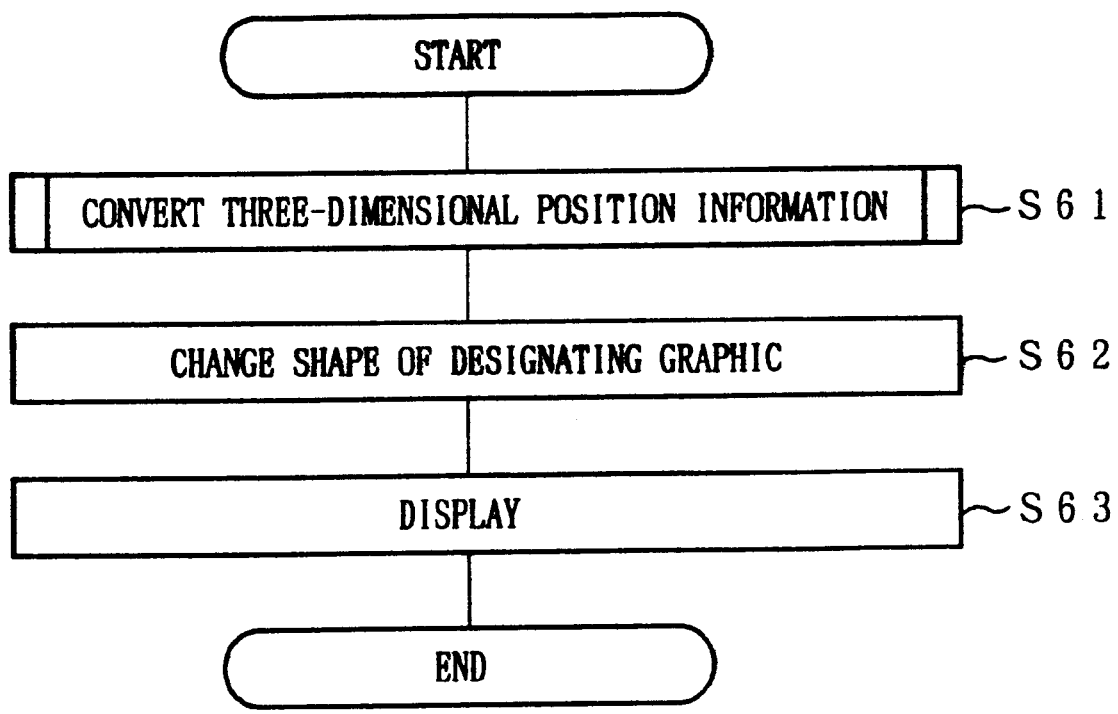
FIG. 16 is a flow chart which shows an operation of the data input unit according to embodiment 6 of the present invention.

The operation of the data input unit having the above arrangement is explained with reference to the flow chart of FIG. 16.

First, the converting process for the three-dimensional position information described in embodiment 5 is performed in the same manner as S51 through S55 (S61). In order to change the size, direction and design of the designating graphic based upon retained results of discriminating information and respective pieces of discriminated height information, designating graphic data are processed (S62). The output unit 14 displays the designating graphic based upon the data processed at S62 (S63).

For example, as shown in FIG. 17, the relationship between relative positions of the input units 11a and 11b in the plane is represented by positions where graphics K and L are displayed on the screen. The discrimination between the input units 11a and 11b is represented by a difference in directions of the designating graphics.

In other words, the graphic K representing the relative position of the input unit 11a is displayed in an asymmetrical direction, for example, whereas the graphic L representing the relative position of the input unit 11b is displayed with its right and left being inverted. As a result, the input units 11a and 11b can be discriminated clearly on the display screen. Further, the change in the distance between the input units 11a and 11b and the detecting unit 12 can be represented by the change in a size of the designating graphic (not shown).

As mentioned above, since a shape of a designating graphic is changed on the output unit in the data input unit of the present embodiment, a size, direction and design of the designating graphic on the screen are changed accordingly to a plural pieces of position information. As a result, in the case where a design such as a portrait is changed, for example, interest and intellectual curiosity of an operator can be further improved.

EMBODIMENT 7

The following describes the seventh embodiment of the present invention with reference to the drawings. Here, for convenience of explanation, those members that have the same arrangement and functions, and that are described in the aforementioned embodiments are indicated by the same reference numerals and the description thereof is omitted.

In the data input unit of the present embodiment, the designating graphic data 28a in the memory section 28 are used by adding shape data (size, direction, design, etc.) of the designating graphic to color data (hue, saturation and lightness) of the designating graphic.

Figure 18:
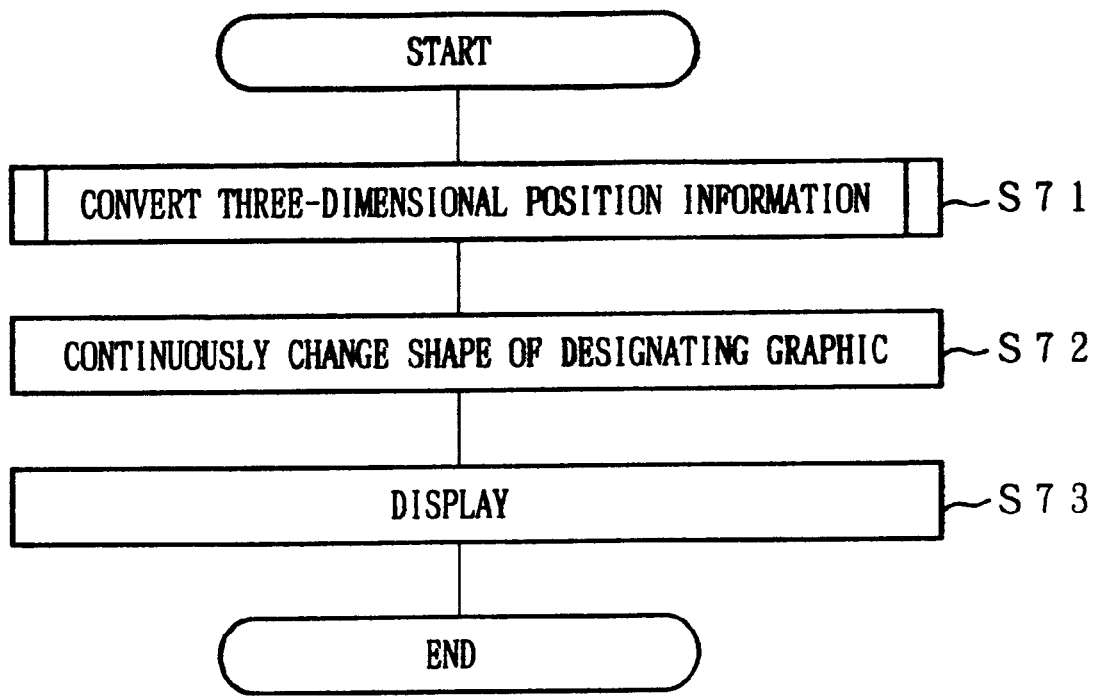
FIG. 18 is a flow chart which shows an operation of the data input unit according to embodiment 7 of the present invention.

The operation of the data input unit having the above arrangement is explained with reference with the flow chart of FIG. 18.

First, the converting process for the three-dimensional position information described in embodiment 5 is performed in the same manner as S51 through S55 (S71). In order to change the shape such as the size, direction and design of the designating graphic into a series of patterns based upon retained result of discriminating information and discriminated height information, designating graphic data are processed (S72). The output unit 14 displays the designating graphic based upon the data processed at S72 (S73).

For example, as shown in FIG. 19, the relationship between relative positions of the input units 11a and 11b in the plane is represented by positions where graphics M and N are displayed on the screen. The discrimination between the input units 11a and 11b is represented by a series of animation showing a change in shapes.

In other words, as the graphic M representing the relative position of the input unit 11a states that a human being is running, which are series of animation showing the change in shapes, are displayed in a fixed position of the screen in the display section 30. Meanwhile, as the graphic N showing the relative position of the input unit 11b, states that a human being is walking, which are a series of animation showing the change in shapes, are displayed in a fixed position of the screen in the display section 30. As a result, the input units 11a and 11b can be discriminated clearly on the display screen. Further, the change in the distance between the input units 11a and 11b and the detecting unit 12 can be represented by the change in a size of the designating graphic (not shown). Moreover, the designating graphic can change a series of patterns and a color.

As mentioned above, since a design such as a portrait can be changed as a series of animation in the data input unit of the present embodiment, interest and intellectual curiosity of an operator can be further improved. Moreover, for example, in the case where a plurality of operators perform the input operation by turns, the display is changed as a series of patterns at time intervals so as to display the respective designating graphics according to the order of inputting by the operators. As a result, since the continuous movement of the designating graphic shifts according to the order of the operators' input, plural pieces of position information can be judged with respect to the time axis, namely, can be judged by a speed of the change in display of the designating graphic.

EMBODIMENT 8

The following describes the eighth embodiment of the present invention with reference to the drawings. Here, for convenience of explanation, those members that have the same arrangement and functions, and that are described in the aforementioned embodiments are indicated by the same reference numerals and the description thereof is omitted.

An arrangement of the data input unit of the present embodiment is changed so that display information is outputted by a sound. For this reason, in the I/O section 24c of the CPU 24, a sound is change according to the size of the height information, and a speaker which outputs a sound is added to the output unit 14.

Figure 20:
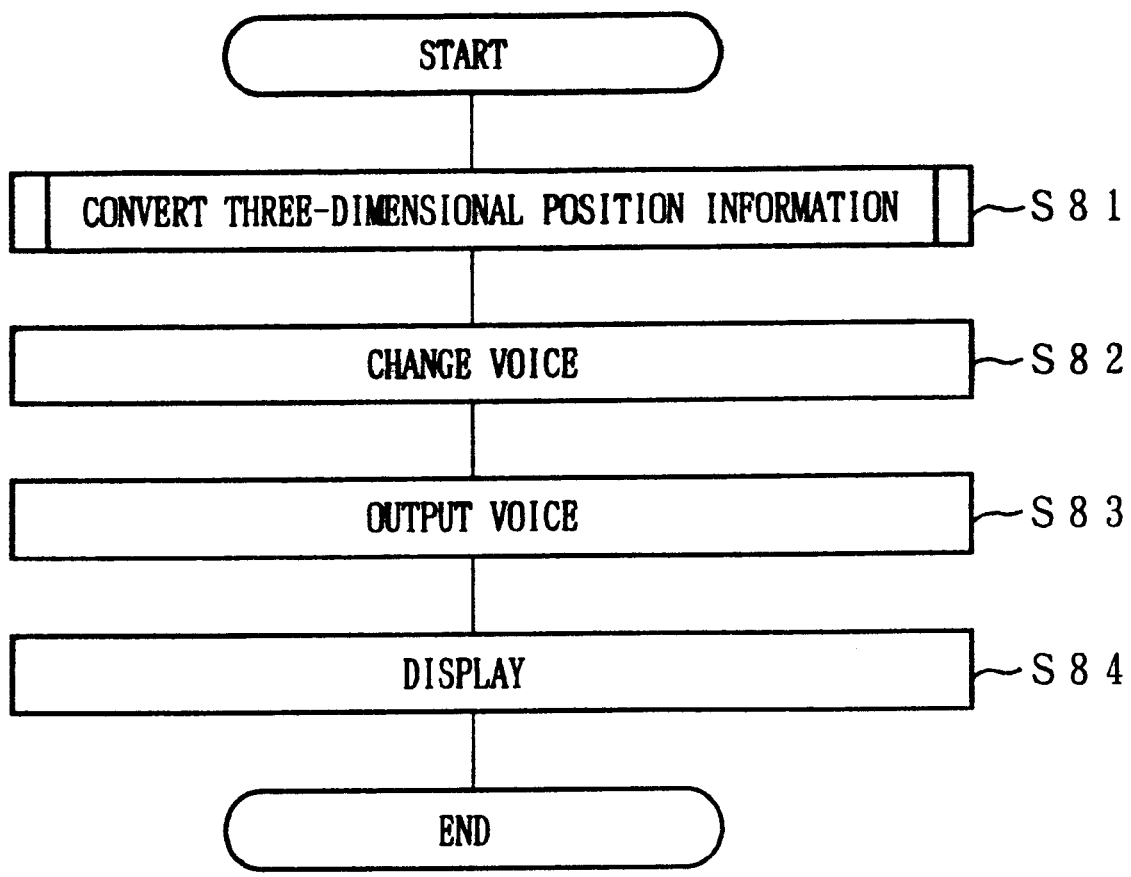
FIG. 20 is a flow chart which shows an operation of the data input unit according to embodiment 8 of the present invention.

The operation of the data input unit having the above arrangement is described with reference to the flow chart of FIG. 20.

First, the converting process for three-dimensional position information described in embodiment 5 is performed in the same manner as S51 through S55 (S81). Data for changing a sound, such as a frequency, volume, chord and interval of a sound, are processed based upon the retained result of discriminating information and discriminating height information (S82). A sound is outputted from the speaker based upon the data processed at S82 (S83), and a designating graphic is displayed (S84).

For example, as shown in FIG. 21, the explanation will be given as to the case of the two input units 11a and 11b. First, when the input unit 11a is operated, the output unit 14 shifts and displays a designating graphic as shown by a graphic O and beeps three times. Meanwhile, when the input unit 11b is operated, the output unit 14 shifts and displays a designating graphic as shown by a graphic P, and beeps once. Further, the change in the distance between the input units 11a and 11b and the detecting unit 12 can be represented by a change in a musical scale outputted when the designating graphic is shifted and displayed (not shown).

As mentioned above, the data input unit of the present invention can judge input data from a plurality of input units aurally. Therefore, the input data from a plurality of input units can be discriminated easily without watching the screen of the output unit. Moreover, since plural pieces of position information can be discriminated simultaneously, a plurality of operators can perform the input operation simultaneously. Further, for example, a plurality of sound data to be outputted are prepared so that a scale of a sound can be successively changed according to the spatial positions of the input units. As a result, interest, understandability and intellectual curiosity of an operator can be further improved.

The color and shape of the designating graphic, successive change of the shape, and sound are changed respectively in the embodiments 5 through 8, but they may be combined arbitrarily. For example, the shape of the designating graphic and a sound can be changed according to a plural pieces of position information. At this time, the designating graphic and the sound to be outputted may be changed simultaneously according to the size of the height information.

In the above case, if the designating graphic is a character such as animals, for example, the designating graphic as a character of each operator can move about according to the distance between the input unit and the detecting unit on the screen while its cry is being changed. In such a manner, since the designating graphic and the sound are changed simultaneously by changing the spatial position of the input unit, interest and intellectual curiosity of the operator can be improved. Therefore, the data input unit of the present embodiment can be applied to computer games and educational processor systems such as CAI systems in the case of a plurality of operators.

In addition, one graphic and sound are outputted for a piece of position information in the aforementioned embodiment, but the graphic and sound may be outputted according to the result of analyzing plural pieces of position information. For example, in the case where a plurality of sending sections are provided to one pen-like input unit (i.e., pen), information such as not only the distance between the pen and the detecting unit but also inclination of the pen (up-and-down direction) as well as a shape of the pen can be inputted as data. As a result, a sound such as "pen is inclined", a warning message and a current state of the inclination of the pen can be outputted on the display unit as a sequence of pictures.

As mentioned above, the data input unit of the present invention includes:

an input unit for indicating an arbitrary spatial position;

a detecting unit for detecting three-dimensional position information corresponding to the spatial position as an absolute coordinate from said detecting unit;

a processing unit which includes an operating section for converting the three-dimensional position information into position information represented by a coordinate in a specific plane and a height in an axial direction perpendicularly intersecting to the plane, a memory section for storing the position information converted by the operating section and an I/O section for outputting display information which is changed according to a size of the height information taken out from the memory section; and an output unit for displaying the spatial position of the input unit based upon the display information from the processing unit.

In accordance with the above arrangement, the three-dimensional position information of the input unit is detected by the detecting unit as the absolute coordinate from the detecting unit. The three-dimensional position information is converted into position information represented by a coordinate in a specific plane and a height with respect to the plane by the operating section in the processing unit so as to be stored in the memory section. Then, the converted position information is processed in the I/O unit and is displayed on the output unit.

At this time, a distance between the input unit and the detecting unit can be calculated from the three-dimensional position information. Moreover, since the display is changed according to the size of the height information, an operator can judge the distance between the input unit and the detecting unit visually. Namely, the relative position of the input unit can be easily confirmed on the screen of the unit adopting the two-dimensional position data input method such as a personal computer, an electronic pocket notebook and a portable terminal. Moreover, since the position of the input unit can be confirmed, the loss of the input unit can be prevented. In the case where the three-dimensional position information is detected by using supersonic waves and radio waves, the input possible range is limited, thereby making it possible to detect the input possible range visually.

In addition, in the above arrangement, it is preferable that the I/O section outputs the display information according to the size of the height information so that a color of a designating graphic designating the position on the display screen is changed. As a result, the data input unit of the present invention can change hue, saturation and lightness of the designating graphic according to the distance between the input unit and the detecting unit. In the case where, for example, the lightness is changed, an operator who is color-blind can discriminate the distance between the input unit and the detecting unit easily.

Furthermore, in the above arrangement, it is preferable that the I/O section outputs the display information according to the size of the height information so that a shape of a designating graphic designating the position on the display screen is changed. As a result, the data input unit of the present invention can change a size, direction and design of a designating graphic according to the distance between the input unit and the detecting unit. In the case where, for example, a design such as a portrait is changed, interest and intellectual curiosity of the operator can be improved.

In addition, the shape of the designating graphic may be changed as a series of patterns. As a result, since a design such as a portrait can be changed as a series of movements, for example, interest and intellectual curiosity of the operator can be further improved. Further, when a series of patterns are changed at time intervals, the distance between the two units can be judged with respect to the time axis.

As mentioned above, another data input unit of the present invention includes:

an input unit for indicating an arbitrary spatial position;

a detecting unit for detecting three-dimensional position information corresponding to the spatial position as an absolute coordinate from said detecting unit;

a processing unit which includes an operating section for converting the three-dimensional position information into position information represented by a coordinate in a specific plane and a height in an axial direction perpendicularly intersecting to the plane, a memory section for storing the position information converted by the operating section, and an I/O section for outputting information including sound data which is changed according to a size of the height information taken out from the memory section; and an output unit for displaying the spatial position of the input unit and outputting a sound based upon the information from the processing unit.

In accordance with the above arrangement, since a sound is changed according to the size of the height information, an operator can judge the distance between the input unit and the detecting unit aurally. Therefore, the relative position of the input unit can be easily confirmed without watching the screen of the output unit. Moreover, since the position of the input unit can be confirmed, the loss of the input unit can be prevented. In the case where the three-dimensional position information is detected by using supersonic waves and radio waves, the input possible range is limited, thereby making it possible to detect the input possible range aurally.

In addition, still another data input unit of the present invention includes:

- a plurality of input units for respectively indicating arbitrary spatial positions;
- a detecting unit for detecting plural pieces of three-dimensional position information corresponding to the spatial positions designated by the input units and detecting the three-dimensional position information as an absolute coordinate from said detecting means;
- a processing unit which includes an operating section for converting the three-dimensional position information into position information represented by a coordinate in a specific plane and a height in an axial direction perpendicularly intersecting to the plane, a memory section for storing the posit ion information converted by the operating section, and an I/O section for outputting display information which is changed according to a change in the position information taken out from the memory section; and
- an output unit for displaying the spatial positions of each of the input units based upon the display information from the processing unit.

In accordance with the above arrangement, the three-dimensional position information of the input unit is detected by the detecting unit as an absolute coordinate from the detecting unit. At this time, since a plurality of the input units exist, plural pieces of three-dimensional position information can be obtained. These plural pieces of three-dimensional position information are converted into position information represented by a coordinate in a specific plane and a height with respect to the plane by the operating section of the processing unit, and are stored in the memory section. Then, the converted position information is processed in the I/O section so as to be displayed on the output unit.

At this time, since the display is changed according to the plural pieces of three-dimensional position information, an operator can judge the position information per input unit on the output unit visually. Namely, the input data from a plurality of input units can be easily judged on the screen of the unit adopting the two-dimensional position data input method such as a personal computer, an electronic pocket notebook and a portable terminal. Moreover, since plural pieces of position information can be discriminated simultaneously, a plurality of operators can perform an input operation simultaneously. For this reason, the data input unit of the present invention can be widely applied to a meeting system using a personal computer.

In addition, in the above arrangement, it is preferable that the I/O section outputs display information according to plural pieces of position information so that a color of a designating graphic which designates a position on the display screen is changed. As a result, the data input unit can discriminate plural pieces of position information easily by the same effects as the case of one input unit.

In addition, in the above arrangement, it is preferable that I/O section outputs display information according to plural pieces of position information so that a shape of a designating graphic which designates a position on the display screen. The data input unit can produces the same functions and effects as the case of one input unit.

In addition, the shape of the designating graphic may be changed as a series of patterns. As a result, the data input unit can produce the same functions and effects as the case of one input unit. Moreover, in the case where, for example, a plurality of operators perform the input operation by turns, the display is changed as a series of patterns at time intervals so as to display the respective designating graphics according to the order of inputting by the operators. As a result, since the continuous movement of the designating graphics shifts according to the order of the operator's input, plural pieces of position information can be judged with respect to the time axis.

Still another data input unit of the present invention includes:

- a plurality of input units for respectively indicating arbitrary spatial positions;
- a detecting unit for detecting plural pieces of three-dimensional position information corresponding to the spatial positions designated by the input units as an absolute coordinate from the detecting unit;
- a processing unit which includes an operating section for converting the three-dimensional position information into position information represented by a coordinate in a specific plane and a height in an axial direction perpendicularly intersecting to the plane, a memory section for storing the position information converted by the operating section and an I/O section for outputting information including sound data which is changed according to a change in the position information taken out from the memory section; and
- an output unit for displaying the spatial positions of the input units and outputting the sounds based upon the information from the processing unit.

In accordance with the above arrangement, since the sound is changed according to the plural pieces of three-dimensional position information, an operator can judge information per input unit on the output unit aurally. Therefore, input data from a plurality of the input units can be easily discriminated without watching the screen of the output unit. Moreover, since plural pieces of position information can be discriminated simultaneously, a plurality of operators can perform the input operation simultaneously.

In addition, one display or sound is outputted for one piece of position information, but the display or sound can be outputted from results of analyzing plural pieces of position information. In the case where, for example, a plurality of sending sections are provided to one pen-like input unit (i.e., pen), not only the distance between the pen and the detecting unit but also information such as inclination of the pen (up-and-down direction) and a shape of the pen can be inputted as data. As a result, the operator can discriminate the information visually and aurally.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data input unit comprising:
   an input unit for indicating an arbitrary spatial position;
   a detecting unit for detecting three-dimensional position information corresponding to the spatial position as an absolute coordinate from said detecting unit;

a processing unit including an operating section for converting the three-dimensional position information into position information represented by a coordinate in a specific plane and a height in an axial direction perpendicularly intersecting to the plane, a memory section for storing the position information converted by said operating section, and an I/O section for outputting display information which is changed according to a size of the height information taken out from said memory section; and an output unit for displaying a two-dimensional display of the spatial position of said input unit based upon the display information from said processing unit.

2. The data input unit according to claim 1, wherein the display information includes data for changing a color of a designating graphic, which designates a position on a display screen, according to the size of the height information.

3. The data input unit according to claim 1, wherein the display information includes data for changing a size of a designating graphic, which designates a position on a display screen, according to the size of the height information.

4. The data input unit according to claim 1, wherein said input unit is included in a pen-type pointing device.

5. The data input unit according to claim 1, wherein:
said input unit includes a sending section for sending sound waves,
said detecting unit includes a receiving section for receiving sound waves and detects the three-dimensional position information by using the received sound waves.

6. The data input unit according to claim 1, wherein:
said input unit includes a sending section for sending radio waves,
said detecting unit includes a receiving section for receiving radio waves and detects the three-dimensional position information by using the received radio waves.

7. The data input unit according to claim 2, wherein the display information includes data for changing a shape of the designating graphic, which designates the position on the display screen, according to the size of the height information.

8. The data input unit according to claim 2, wherein the data include data for changing at least one of hue, saturation and lightness of the color of the designating graphic.

9. The data input unit according to claim 7, wherein the data include data for changing the shape of the designating graphic as animation composed of a series of patterns.

10. The data input unit according to claim 9, wherein the data include data for changing a speed of a change in the shape.

11. The data input unit according to claim 9, wherein the data include data for changing time intervals between changes of patterns according to a distance between said input unit and said detecting unit.

12. The data input unit according to claim 4, wherein:
the pen-type pointing device includes at least one more input unit besides said input unit; and
the display information includes data representing an inclination of the pointing device based upon plural pieces of position information detected by said detecting unit regarding the spatial positions of said input unit and said at least one more input unit.

13. A data input unit comprising:
an input unit for indicating an arbitrary spatial position;
a detecting unit for detecting three-dimensional position information corresponding to the spatial position as an absolute coordinate from said detecting unit;

a processing unit including an operating section for converting the three-dimensional position information into position information represented by a coordinate in a specific plane and a height in an axial direction perpendicularly intersecting to the plane, a memory section for storing the position information converted by said operating section, and an I/O section for outputting display information including sound data which is changed according to a size of the height information taken out from said memory section; and an output unit for displaying the spatial position of said input unit and outputting a sound based upon the display information from said processing unit.

14. The data input unit according to claim 13, wherein:
the output information further includes display data, and the sound data and the display data are changed according to the size of the height information taken out from said memory section.

15. The data input unit according to claim 13, wherein the output information includes data for changing a color of a designating graphic, which designates a position on a display screen, according to the size of the height information.

16. The data input unit according to claim 15, wherein the output information includes data for changing a shape of a designating graphic, which designates a position on a display screen, according to the size of the height information.

17. The data input unit according to claim 16, wherein the output information includes data for changing the shape of the designating graphic as animation composed of a series of patterns.

18. A data input unit comprising:
a plurality of input units for respectively indicating arbitrary spatial positions;
a detecting unit for detecting plural pieces of three-dimensional position information corresponding to the spatial positions respectively designated by said input units as an absolute coordinate from said detecting unit;
a processing unit including an operating section for converting the three-dimensional position information into position information represented by a coordinate in a specific plane and a height in an axial direction perpendicularly intersecting to the plane, a memory section for storing the position information converted by said operating section, and an I/O section for outputting display information which is changed according to a change in the position information taken out from said memory section; and
an output unit for displaying the spatial positions of said input units based upon the display information from said processing unit.

19. The data input unit according to claim 18, wherein the display information includes data for changing a color of a designating graphic, which designates a position on a display screen, according to said plural pieces of position information.

20. The data input unit according to claim 18, wherein the display information includes data for changing a shape of a designating graphic, which designates a position on a display screen, according to said plural pieces of position information.

21. The data input unit according to claim 18, wherein said input units are included in a pen-type pointing device.

22. The data input unit according to claim 18, wherein:
said plurality of input units respectively include sending sections for sending sound waves with different frequencies,
said detecting unit includes a receiving section for receiving sound waves with different frequencies, and discriminates said respective input units according to the frequencies of the received sound waves and detects the three-dimensional position information per input unit by using the sound waves.

23. The data input unit according to claim 18, wherein:
said plurality of input units respectively include sending sections for sending radio waves with different frequencies,
said detecting unit includes a receiving section for receiving radio waves with different frequencies, and discriminates said respective input units according to the frequencies of the received radio waves and detects the three-dimensional position information per input unit by using the radio waves.

24. The data input unit according to claim 19, wherein the display information includes data for changing a shape of the designating graphic, which designates the position on the display screen, according to said plural pieces of position information.

25. The data input unit according to claim 19, wherein the data include data for changing at least one of hue, saturation and lightness of the color of the designating graphic.

26. The data input unit according to claim 24, wherein the data include data for changing the shape of the designating graphic as animation composed of a series of patterns.

27. The data input unit according to claim 20, wherein the data include data for changing a speed of the change in the shape.

28. The data input unit according to claim 20, wherein the data include data for changing time intervals between changes in the patterns according to distances between said input units and said detecting unit.

29. The data input unit according to claim 21, wherein:
the display information includes data for representing inclination of the pointing device based upon said plural pieces of position information.

30. A data input unit comprising:
a plurality of input units for respectively indicating arbitrary spatial positions;
a detecting unit for detecting plural pieces of three-dimensional position information corresponding to the spatial positions designated by said input units as an absolute coordinate from said detecting unit;
a processing unit including an operating section for converting the three-dimensional position information into position information represented by a coordinate in a specific plane and a height in an axial direction perpendicularly intersecting to the plane, a memory section for storing the position information converted by said operating section, and an I/O section for outputting the display information including sound data which is changed according to a change in the position information taken out from said memory section; and
an output unit for displaying the spatial positions of said input units and outputting sounds based upon the display information from said processing unit.

31. The data input unit according to claim 30, wherein:
the output information further includes display data and the sound data and the display data are changed according to a change in the position information taken out from said memory section.

32. The data input unit according to claim 30, wherein the output information includes data for changing a color of a designating graphic, which designates a position on a display screen, according to said plural pieces of position information.

33. The data input unit according to claim 32, wherein the output information includes data for changing a shape of the designating graphic, which designates the position on the display screen, according to said plural pieces of position information.

34. The data input unit according to claim 33, wherein the output information includes data for changing the shape of the designating graphic as animation composed of a series of patterns.

35. The data input unit according to claim 33, wherein:
the designating graphic has an asymmetrical shape,
the data include data for inverting the shape of the designating graphic with respect to a certain axis in the case of two input units.

36. A data input method comprising the steps of:
detecting three-dimensional position information of a sending source indicating an arbitrary spatial position;
converting the three-dimensional position information into position information represented by a coordinate in a specific plane and a height in an axial direction perpendicularly intersecting the plane;
generating display information which is changed according to a change in the position information; and
displaying the spatial position of the sending source based upon the display information.

37. A data input unit comprising:
an input unit for indicating an arbitrary spatial position;
a detecting unit for detecting three-dimensional position information of said input unit;
a processing unit including an operating section for converting the three-dimensional position information into position information represented by coordinates in a plane and a height relative to the plane, and an I/O section for outputting output information which changes in accordance with changes in the magnitude of the height caused by movement of said input unit; and
a communication unit for communicating the spatial position of said input unit based upon the output information of said processing unit.

38. The data input unit according to claim 37, wherein said communication unit comprises a two-dimensional display for displaying the spatial position of said input unit using a designating graphic.

39. The data input unit according to claim 38, wherein the appearance of the designating graphic is changed as the magnitude of the height changes.

40. The data input unit according to claim 39, wherein the appearance of the designating graphic is changed by changing one or more of the group consisting of: color, size, shape, hue, saturation and lightness.

41. The data input unit according to claim 37, wherein said communication unit comprises a speaker for outputting sounds indicative of the spatial position of said input unit.

42. The data input unit according to claim 41, wherein the sound output by said speaker is changed as the magnitude of the height changes.

43. The data input unit according to claim 42, wherein the sound is changed by changing the number of beeps output by said speaker.

44. The data input unit according to claim 37, wherein said communication unit includes a two-dimensional display for displaying the spatial position of said input unit using a designating graphic and a speaker for outputting sounds indicative of the spatial position of said input unit.

45. The data input unit according to claim 44, wherein the appearance of the designating graphic and the sound output by said speaker are changed simultaneously as the magnitude of the height changes.

* * * * *